(12) United States Patent
Ye

(10) Patent No.: US 12,470,156 B2
(45) Date of Patent: Nov. 11, 2025

(54) SOUND GENERATOR COMPRISING PIEZOELECTRIC DEVICE AND SOUND APPARATUS

(71) Applicant: LG DISPLAY CO., LTD., Seoul (KR)

(72) Inventor: Jaehun Ye, Tokyo (JP)

(73) Assignee: LG Display Co., Ltd (KR)

( * ) Notice: Subject to any disclaimer, the term of this patent is extended or adjusted under 35 U.S.C. 154(b) by 988 days.

(21) Appl. No.: 17/566,137

(22) Filed: Dec. 30, 2021

(65) Prior Publication Data

US 2022/0216810 A1 Jul. 7, 2022

(30) Foreign Application Priority Data

Jan. 6, 2021 (JP) ................................. 2021-000737

(51) Int. Cl.
*H02N 2/00* (2006.01)
*G06F 3/16* (2006.01)
*H04R 17/00* (2006.01)

(52) U.S. Cl.
CPC ........... *H02N 2/0015* (2013.01); *G06F 3/167* (2013.01); *H02N 2/006* (2013.01); *H04R 17/00* (2013.01)

(58) Field of Classification Search
CPC .... H02N 2/0015; H02N 2/006; H04R 1/2811; H04R 1/2849; H04R 1/2857; H04R 7/08; H04R 7/045; H04R 7/06; H04R 9/02; H04R 9/06; H04R 17/00; H04R 2400/11; H04R 2440/05; H04R 2499/15; G06F 3/167
See application file for complete search history.

(56) References Cited

U.S. PATENT DOCUMENTS

| | | | |
|---|---|---|---|
| 9,445,200 B2 * | 9/2016 | Kim | H04R 7/26 |
| 2012/0057730 A1 | 3/2012 | Fujise et al. | |
| 2014/0044301 A1 * | 2/2014 | Zhang | G06F 3/016 |
| | | | 381/388 |
| 2017/0257706 A1 | 9/2017 | Yamazaki et al. | |
| 2018/0084347 A1 * | 3/2018 | Fukami | H04R 17/00 |
| 2020/0213768 A1 * | 7/2020 | Lee | H04R 17/00 |
| 2020/0404213 A1 | 12/2020 | Won et al. | |

FOREIGN PATENT DOCUMENTS

| | | |
|---|---|---|
| CN | 105721996 A | 6/2016 |
| JP | S 60190100 A | 9/1985 |
| JP | H 09327094 A | 12/1997 |
| JP | 10-94093 A | 4/1998 |

(Continued)

OTHER PUBLICATIONS

Japanese Office Action dated Mar. 30, 2023 issued in Patent Application No. 2022-041341 (2 pages).

(Continued)

*Primary Examiner* — Emily P Pham
(74) *Attorney, Agent, or Firm* — Fish & Richardson P.C.

(57) ABSTRACT

A sound generator includes a piezoelectric device, a first weight member disposed at a first portion of the piezoelectric device, a second weight member disposed at a second portion of the piezoelectric device, a first elastic member disposed at a third portion between the first portion and the second portion of the piezoelectric device, and a protection member configured to cover the piezoelectric device, the first weight member, the second weight member, and the first elastic member.

18 Claims, 22 Drawing Sheets

(56) References Cited

FOREIGN PATENT DOCUMENTS

| | | |
|---|---|---|
| JP | 2014-143649 A | 8/2014 |
| JP | 2015-186130 A | 10/2015 |
| JP | 2019-114958 A | 7/2019 |
| JP | 2019-116038 A | 7/2019 |
| JP | 2019-146108 A | 8/2019 |
| KR | 10-0729152 B1 | 6/2007 |
| KR | 2012-0017384 A | 2/2012 |
| KR | 20170076549 A | 7/2017 |
| KR | 2017-0093857 A | 8/2017 |
| KR | 2018-0077582 A | 7/2018 |
| WO | 2019/116038 A1 | 6/2019 |

OTHER PUBLICATIONS

Korean Office Action dated Oct. 26, 2023 issued in Patent Application No. 2021-0188889 (9 pages).
Office Action in Chinese Appln. No. 202111626214.6, mailed on Feb. 25, 2025, 14 pages (with English translation).

\* cited by examiner

SOUND GENERATOR COMPRISING PIEZOELECTRIC DEVICE AND SOUND APPARATUS

CROSS-REFERENCE TO RELATED APPLICATION

This application claims the priority of Japanese Patent Application No. 2021-000737 filed on Jan. 6, 2021, which is hereby incorporated by reference in its entirety.

BACKGROUND

Field of the Disclosure

The present disclosure relates to a sound generator and a sound apparatus.

Description of the Background

Recently, display apparatuses having improved sound performance for enhancing a sense of realism are being developed, and technology for enabling a display panel to function as a speaker is being developed.

As examples, Korean Patent Publication No. 10-2018-0077582 discloses a display apparatus including a display panel and an actuator, and Korean Patent Publication No. 10-2018-0077582 may be referred to as a display enabling sound apparatus which controls the actuator to vibrate the display panel to generate a sound.

SUMMARY

Accordingly, aspects of the present disclosure are directed to providing a sound generator and a sound apparatus that substantially obviate one or more problems due to limitations and disadvantages of the related art.

However, the related art needs the improvement of sound quality.

An aspect of the present disclosure is directed to providing a sound generator and a sound apparatus, which have enhanced sound quality.

Additional advantages and features of the disclosure will be set forth in part in the description which follows and in part will become apparent to those having ordinary skill in the art upon examination of the following or may be learned from practice of the disclosure. Other advantages of the disclosure may be realized and attained by the structure particularly pointed out in the written description and claims hereof as well as the appended drawings.

To achieve these and other aspects of the inventive concepts, as embodied and broadly described, a sound generator comprises a piezoelectric device; a first weight member disposed at a first portion of the piezoelectric device; a second weight member disposed at a second portion of the piezoelectric device; a first elastic member disposed at a third portion between the first portion and the second portion of the piezoelectric device; and a protection member configured to cover the piezoelectric device, the first weight member, the second weight member, and the first elastic member.

In another aspect of the present disclosure, a sound apparatus comprises a sound generator including a piezoelectric device, and an external frame configured to cover the sound generator, the external frame including an opening portion and a plurality of first vibration plates, the sound generator is disposed at the opening portion.

According to the aspects of the present disclosure, a sound generator and a sound apparatus with enhanced sound quality may be provided.

It is to be understood that both the foregoing general description and the following detailed description of the present disclosure are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate aspects of the disclosure and together with the description serve to explain the principle of the disclosure.

In the drawings.

Figure 1:
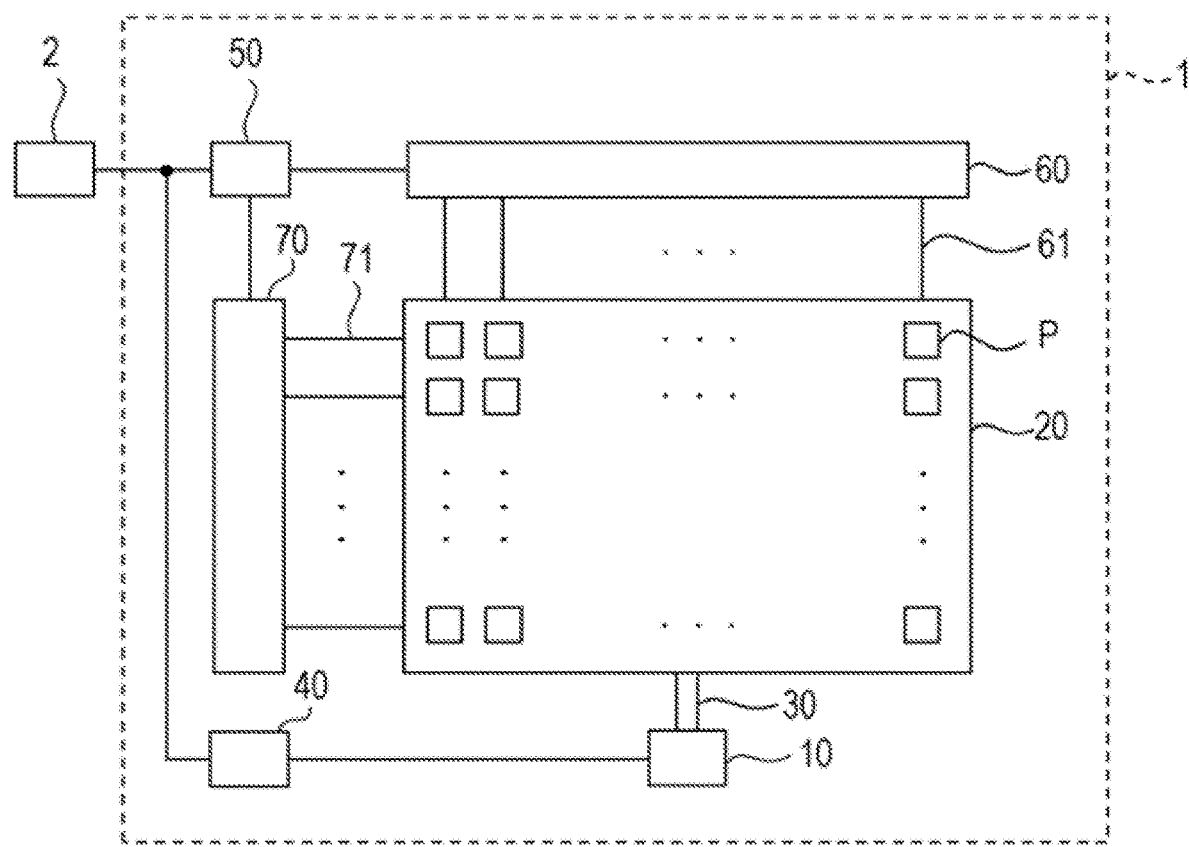
FIG. 1 is a diagram schematically illustrating a display apparatus.

Throughout the drawings and the detailed description, unless otherwise described the same drawing reference numerals should be understood to refer to the same elements, features, and structures. The relative size and depiction of these elements may be exaggerated for clarity, illustration, and convenience.

DETAILED DESCRIPTION

Reference will now be made in detail to aspects of the present disclosure, examples of which may be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations are selected only for convenience of writing the specification and may be thus different from those used in actual products.

Advantages and features of the present disclosure, and implementation methods thereof will be clarified through following aspects described with reference to the accompanying drawings. The present disclosure may, however, be embodied in different forms and should not be construed as limited to the aspects set forth herein. Rather, these aspects are provided so that this disclosure will be thorough and complete, and will fully convey the scope of the present disclosure to those skilled in the art. Furthermore, the present disclosure is only defined by scopes of claims.

The shape, a size, a ratio, an angle, and a number disclosed in the drawings for describing aspects of the present disclosure are merely an example, and thus, the aspects of present disclosure are not limited to the illustrated details. Like reference numerals refer to like elements throughout. In the following description, when the detailed description of the relevant known function or configuration is determined to unnecessarily obscure the important point of the present disclosure, the detailed description will be omitted. When "comprise," "have," and "include" described in the present specification are used, another part may be added unless "only" is used. The terms of a singular form may include plural forms unless referred to the contrary.

In construing an element, the element is construed as including an error or tolerance range although there is no explicit description of such an error or tolerance range.

In describing a position relationship, for example, when a position relation between two parts is described as, for example, "on," "over," "under," and "next," one or more other parts may be disposed between the two parts unless a more limiting term, such as "just" or "direct(ly)" is used.

In describing a time relationship, for example, when the temporal order is described as, for example, "after," "subsequent," "next," and "before," a case that is not continuous may be included unless a more limiting term, such as "just," "immediate(ly)," or "direct(ly)" is used.

In the description of aspects, when a structure is described as being positioned "on or above" or "under or below" another structure, this description should be construed as including a case in which the structures contact each other as well as a case in which a third structure is disposed therebetween.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms "first," "second," "A," "B," "(a)," "(b)," etc. may be used. These terms are intended to identify the corresponding elements from the other elements, and basis, order, or number of the corresponding elements should not be limited by these terms. The expression that an element is "connected," "coupled," or "adhered" to another element or layer, the element or layer can not only be directly connected or adhered to another element or layer, but also be indirectly connected or adhered to another element or layer with one or more intervening elements or layers "disposed," or "interposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

A size and a thickness of each component illustrated in the drawing are illustrated for convenience of description, and the present disclosure is not limited to the size and the thickness of the component illustrated.

Features of various aspects of the present disclosure may be partially or overall coupled to or combined with each other, and may be variously inter-operated with each other and driven technically as those skilled in the art can sufficiently understand. Aspects of the present disclosure may be carried out independently from each other, or may be carried out together in co-dependent relationship.

Hereinafter, aspects of the present disclosure will be described in detail with reference to the accompanying drawings. In the drawings, like reference numerals refer to like elements having a common function, and repeated descriptions are omitted or will be briefly given. For convenience of description, a scale of each of elements illustrated in the accompanying drawings differs from a real scale, and thus, is not limited to a scale illustrated in the drawings.

[A Premise Technique]

FIG. 1 is a diagram schematically illustrating a display apparatus 1 according to a premise technique.

The display apparatus 1 may be electronic posters, digital bulletin boards, electronic advertisement signboards, computer image output devices, televisions, smart phones, or game machines, or the like, but aspects of the present disclosure are not limited thereto.

As illustrated in FIG. 1, the display apparatus 1 may include a piezoelectric device 10, a display panel 20, an elastic member 30, a first controller 40, a second controller 50, a data driving circuit 60, a gate driving circuit 70. The display apparatus 1 may be an apparatus which displays an image by a display panel 20 based on RGB data or the like input thereto and generates a sound or a vibration based on a sound signal (or a vibration driving signal) or the like input thereto. Thus, the display apparatus 1 may be implemented as a sound apparatus.

The display panel 20 may include the plurality of pixels P arranged in a matrix. The pixel P may include a light emitting device including an organic light emitting diode or the like. When the display apparatus 1 is capable of displaying a color image, the pixel P may be a subpixel which displays one of a plurality of colors (for example, RGB) implementing a color image.

The piezoelectric device 10 may be an element where displacement occurs due to an inverse piezoelectric effect when a voltage is applied based on a sound signal input thereto. The piezoelectric device 10 may be an element where bent displacement occurs due to a voltage such as bimorph or unimorph. Because an input sound signal is an alternating current (AC) voltage, the piezoelectric device 10 may act as a vibration device which vibrates according to a sound signal input thereto.

The elastic member 30 may be a member configured by a material having elasticity. A material of the elastic member 30 may have an elastic modulus which is lower than the piezoelectric device 10 and the display panel 20, and may be, for example, a material such as rubber or the like. A portion of the piezoelectric device 10 may be coupled or connected to a portion of the display panel 20 by the elastic member 30, and thus, a vibration of the piezoelectric device 10 may be transferred to the display panel 20, and the display panel 20 may generate a sound based on a sound signal input thereto.

A host system 2 may be a system including an apparatus or a plurality of apparatuses, which provide(s) an image signal such as RGB data or the like, a sound signal, and a timing signal to control the display apparatus 1. The timing signal may include a vertical synchronization signal, a horizontal synchronization signal, and a data enable signal, or the like. The host system 2 may be, for example, a source sound reproduction apparatus, a local broadcast apparatus, a radio broadcast reproduction system, a television (TV) system, a set-top box, a navigation system, an optical disk player, a computer, a home theater system, and a video phone system, or the like. Also, the display apparatus 1 and the host system 2 may be an integrated apparatus, or may be configured as separate apparatuses.

The first controller 40 may provide a voltage to the piezoelectric device 10 based on a sound signal and a timing signal input from the host system 2. The second controller 50 may control the data driving circuit 60 and the gate driving circuit 70 based on image data and a timing signal input from the host system 2. The data driving circuit 60 may supply data voltages or the like to a plurality of pixels P through a driving line 61 disposed at each column of the plurality of pixels P. The gate driving circuit 70 may supply a control signal to the plurality of pixels P through a driving line 71 disposed at each row of the plurality of pixels P. Also, each of the driving line 61 and the driving line 71 may be provided in a plurality lines (or wiring lines).

Each of the first controller 40, the second controller 50, the data driving circuit 60, and the gate driving circuit 70 may be configured by one semiconductor IC or a plurality of semiconductor ICs. Also, some or all of the first controller 40, the second controller 50, the data driving circuit 60, and the gate driving circuit 70 may be configured as one semiconductor IC or one body (or a single body).

Figure 2:
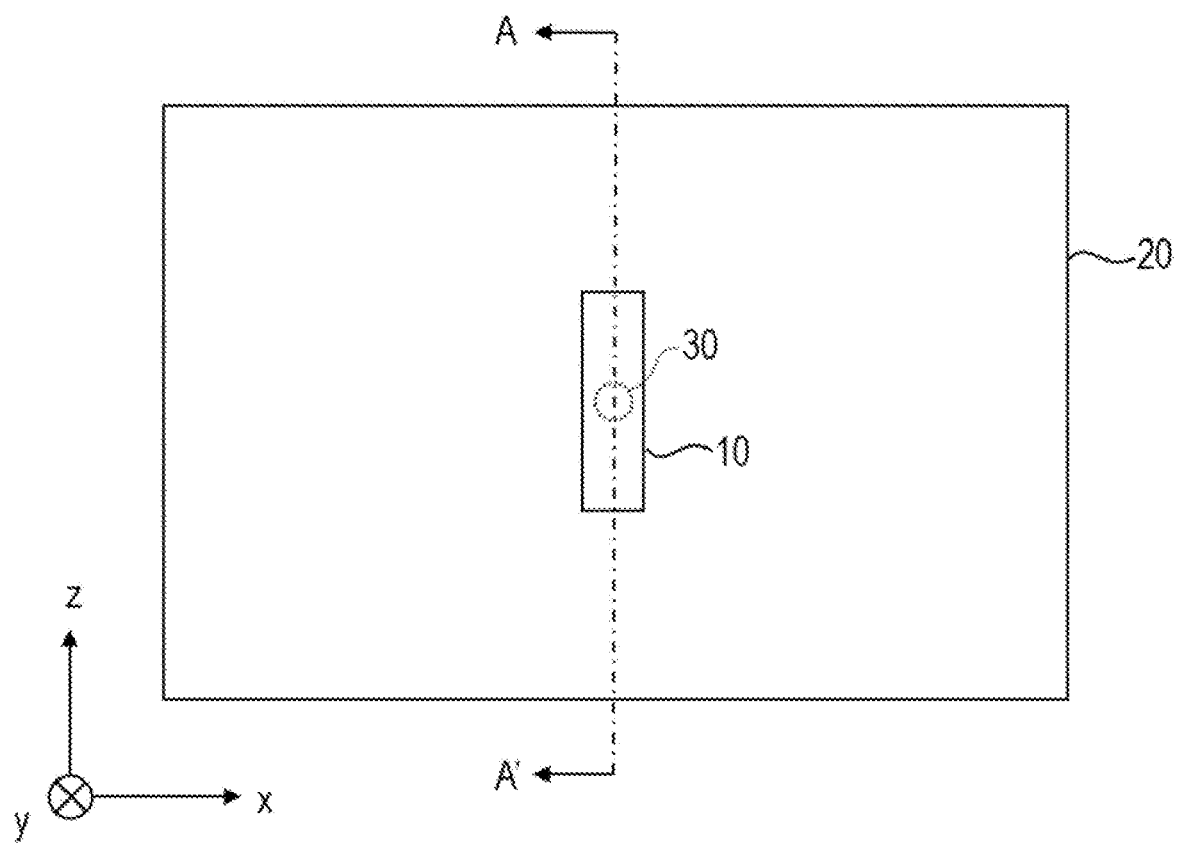
FIG. 2 is a plan view illustrating a schematic configuration of piezoelectric devices.
Figure 3:
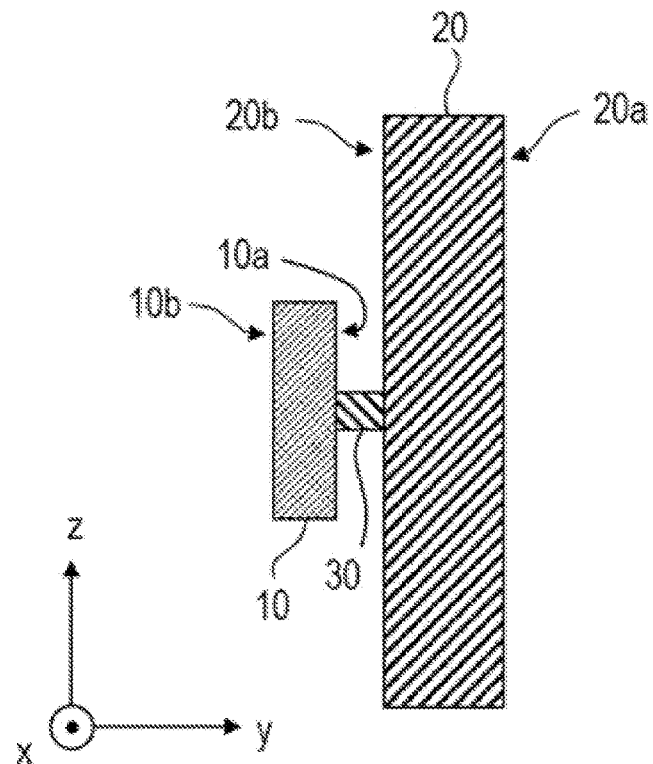
FIG. 3 is a cross-sectional view taken along line A-A' illustrated in FIG. 2.

FIG. 2 is a plan view illustrating a schematic configuration of piezoelectric devices 10 according to a premise technique. FIG. 3 is a cross-sectional views taken along line A-A' illustrated in FIG. 2. In FIG. 2, a tetragonal (or a rectangular) border (or boundary) of a display panel 20 schematically illustrates an external frame or an external appearance or an external shape of the display panel 20.

One main surface of the display panel 20 illustrated in FIG. 3 may be an image display surface (or a first surface or a front surface) 20a, and the other main surface may be a rear surface (or a second surface or a backside surface) 20b. In coordinate axes illustrated in FIGS. 2 and 3, a horizontal direction of the image display surface 20a illustrates a x axis, a vertical direction of the image display surface 20a illustrates a z axis, and a depth direction of the image display surface 20a illustrates a y axis. Also, a direction from the rear surface 20b to the image display surface 20a may be a forward direction of the y-axis.

The shape of the piezoelectric device 10 may be a rectangular shape having a long-side direction (a z direction in FIGS. 2 and 3) and a short-side direction (an x direction in FIGS. 2 and 3) with respect to a plan view, and may be a flat plate shape. Accordingly, deformation which is bent to a cross-sectional surface (line A-A') in the long-side direction may occur. A long-side direction of the piezoelectric device 10 may be disposed to be perpendicular to an end portion of the display panel 20.

An elastic member 30 may be connected (or coupled) to a portion including a center of the piezoelectric device 10 in the long-side direction thereof. The center of the piezoelectric device 10 in the long-side direction thereof may be a portion which is an antinode of a vibration, and thus, a vibration may be efficiently transferred to the display panel 20.

The piezoelectric device 10 illustrated in FIG. 3 may include a main surface (or a first surface) 10a and a second main surface (or a second surface) 10b. The elastic member 30 may connect (or couple) the first surface 10a of the piezoelectric device 10 to a rear surface 20b of the display panel 20. As described above, the piezoelectric device 10 and the elastic member 30 may be disposed at the rear surface 20b of the display panel 20 so as not to obstruction with image display of the image display surface 20a.

The elastic member 30 may be connected (or coupled) to only a portion of the first surface 10a of the piezoelectric device 10. Therefore, both end portions of the piezoelectric device 10 in a long-side direction thereof may be lifted, and thus, it may be suppressed the vibration of the piezoelectric device 10 at the both end portions, where a displacement of a bending vibration (or flexural vibration) is large of the piezoelectric device 10 in the long-side direction thereof.

Figure 4:
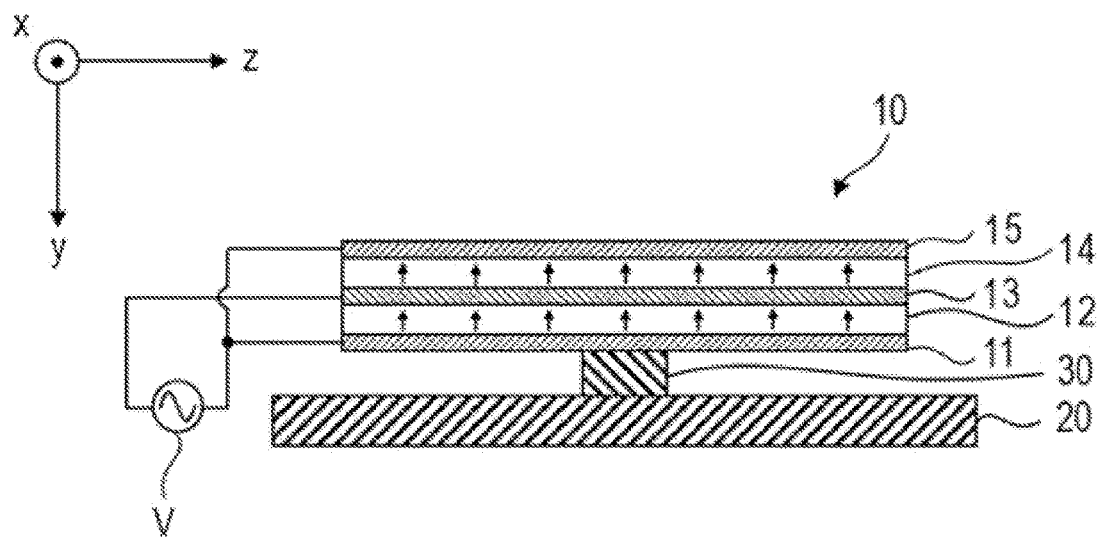
FIG. 4 is a cross-sectional view illustrating in more detail a structure of a piezoelectric device.

FIG. 4 is a cross-sectional view illustrating in more detail a structure of a piezoelectric device 10 according to a premise technique. FIG. 4 is a cross-sectional view taken along line A-A' illustrated in FIG. 2 like FIG. 3 although a direction in which FIG. 3 is rotated 90 degrees to the right. Also, FIG. 4 schematically illustrates, by a circuit diagram, a connection relationship between electrodes included in the piezoelectric device 10, for describing a method of inputting a sound signal to the piezoelectric device 10.

The piezoelectric device 10 illustrated in FIG. 4 may include a bimorph structure where two piezoelectric layers are stacked. The piezoelectric device 10 illustrated in FIG. 4 may include a first electrode 11, a first piezoelectric layer 12, a second electrode 13, a second piezoelectric layer 14, and a third electrode 15. The first electrode 11 may be disposed closest to the display panel 20 and may be connected to the elastic member 30. The third electrode 15 may be disposed farthest from the display panel 20. The second electrode 13 may be disposed between the first electrode 11 and the third electrode 15.

The first piezoelectric layer 12 may be supported between the first electrode 11 and the second electrode 13. The second piezoelectric layer 14 may be supported between the second electrode 13 and the third electrode 15. Arrows represented inside the first piezoelectric layer 12 and the second piezoelectric layer 14 represent polarization directions, and the polarization direction of the first piezoelectric layer 12 may be the same as the polarization direction of the second piezoelectric layer 14.

Also, a line (or wiring line) to apply a voltage to each electrode may be connected to the first electrode 11, the second electrode 13, and the third electrode 15, but in FIG. 4, the illustration of the line is omitted. In addition, the line may be connected by soldering or the like, and aspects of present disclosure are not limited to a specific method.

A voltage applied to the piezoelectric device 10 may be based on a sound signal, and thus, may be an AC voltage corresponding to a frequency of a sound which is to be generated. In FIG. 4, the AC voltage is represented by a circuit sign for an AC power. In the AC power V, one terminal (or a first terminal) may be connected to the first and third electrodes 11 and 15, and the other terminal (or a second terminal) may be connected to the second electrode 13. For example, the voltage applied to the first electrode 11 and the voltage applied to the third electrode 15 may be the same phase (or in-phase), the voltage applied to the first electrode 11 and the voltage applied to the second electrode 13 may be opposite phases (or anti-phases), and the voltage applied to the second electrode 13 and the voltage applied to the third electrode 15 may be the same phase (or in-phase). Accordingly, the voltage applied to the first piezoelectric layer 12 and the voltage applied to the second piezoelectric layer 14 may be in opposite directions (or reverse directions).

Materials of the first and second piezoelectric layers 12 and 14 may be a piezoelectricity material, and aspects of present disclosure are not limited to a specific material. For example, the first and second piezoelectric layers 12 and 14 may include lead zirconate titanate (PZT) or the like. The PZT have high piezoelectricity, and thus, may have a large displacement amount with respect to the applied voltage. Also, although not illustrated in FIG. 4, an outer periphery (or an outer perimeter) of the piezoelectric device 10 may be covered by an insulator such as resin or the like so as to prevent an electrical short circuit between the piezoelectric device 10 and another member.

Figure 5:
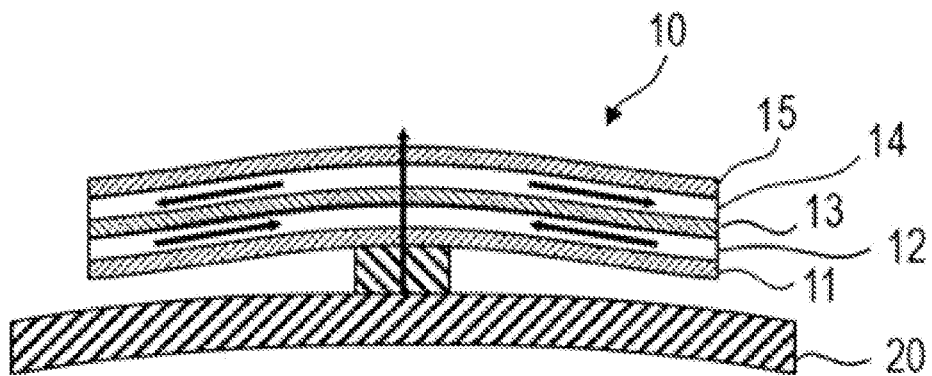
FIG. 5 is a schematic diagram illustrating a deformation contracted in a horizontal direction when a voltage is applied to the piezoelectric device.
Figure 6:
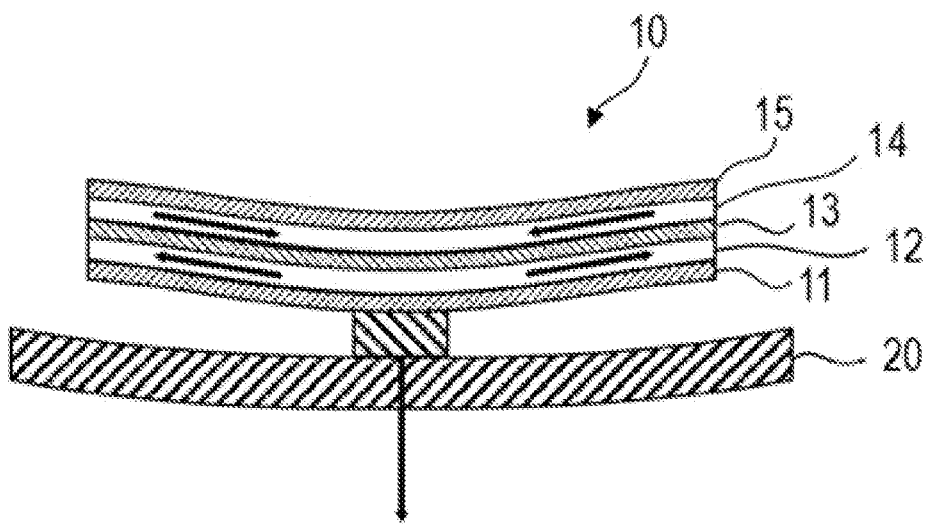
FIG. 6 is a schematic diagram illustrating a deformation expanded in a horizontal direction when a voltage is applied to the piezoelectric device.

FIG. 5 is schematic diagrams illustrating a deformation contracted in a horizontal direction when a voltage is applied to the piezoelectric device 10 in the premise technique. FIG. 6 is schematic diagrams illustrating a deformation expanded in a horizontal direction when a voltage is applied to the piezoelectric device 10 in the premise technique. As illustrated in FIG. 4, the polarization direction of the first piezoelectric layer 12 may be the same as the polarization direction of the second piezoelectric layer 12. A direction of the voltage applied to the first piezoelectric layer 12 may be opposite to a direction of the voltage applied to the second piezoelectric layer 14. For example, the voltages applied to the first and second piezoelectric layers 12 and 14 may have opposite phases. Accordingly, a stretching direction of the first piezoelectric layer 12 may be opposite or inverted (or reversed) to a stretching direction of the second piezoelectric layer 14.

As illustrated in FIG. 5, the second piezoelectric layer 14 may be deformed in a direction expanding in a horizontal direction at a timing at which the first piezoelectric layer 12 is deformed to contract in the horizontal direction. Therefore, an end portion of the piezoelectric device 10 may be bent in a direction closer to the display panel 20. For example, the display 20 may be deformed based on a stress applied thereto toward the piezoelectric device 10.

As illustrated in FIG. 6, the second piezoelectric layer 14 may be deformed in a direction contracting in a horizontal direction at a timing at which the first piezoelectric layer 12 is deformed to expand in the horizontal direction. Therefore, the end portion of the piezoelectric device 10 may be bent in a direction distancing from the display panel 20. For example, the display panel 20 may be deformed based on a stress applied thereto in a direction distancing from the piezoelectric device 10.

When an AC voltage based on a sound signal is applied to the piezoelectric device 10, a shape (or a form) illustrated in FIG. 5 and a shape (or a form) illustrated in FIG. 6 may be alternately repeated in a frequency of a sound. Thus, a vibration of the piezoelectric device 10 may be transferred to the display panel 20 to vibrate the display panel 20. Accordingly, the display panel 20 may act as a speaker so that the display panel 20 generates a sound based on a sound signal.

Figure 7:
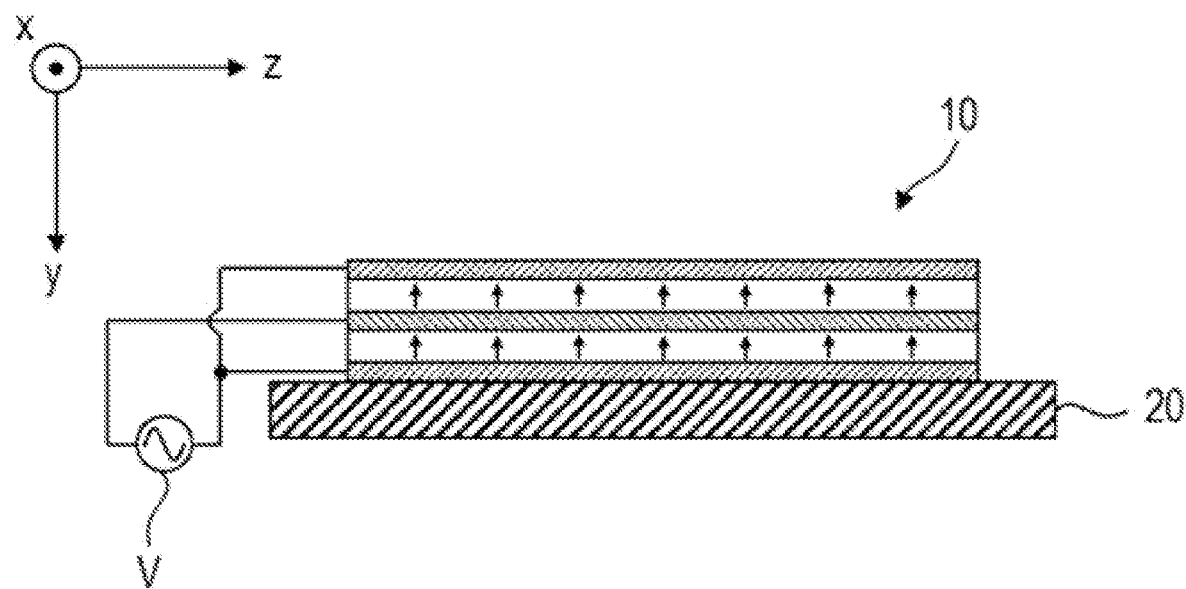
FIG. 7 is a cross-sectional view illustrating a configuration of a piezoelectric device according to a comparative example.
Figure 8:
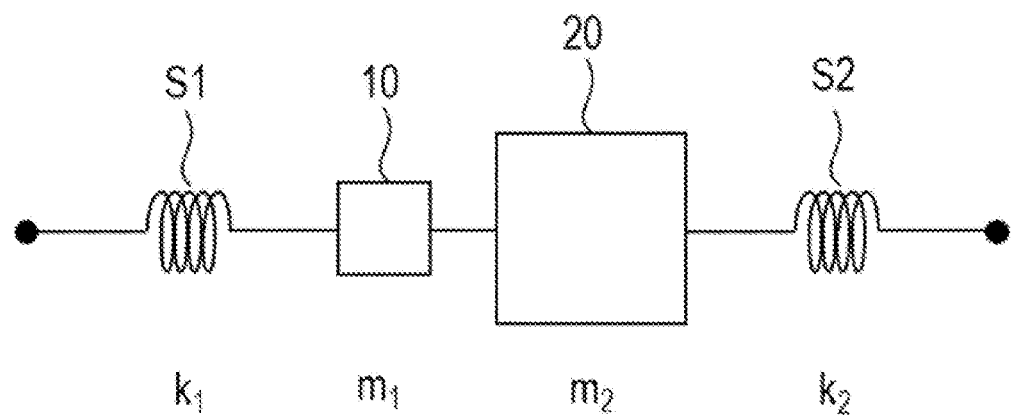
FIG. 8 is a schematic diagram illustrating a vibration model according to the comparative example.

In the premise technique, an effect obtained when a portion of a piezoelectric device 10 is connected to a display panel 20 by an elastic member 30 will be described. FIG. 7 is a cross-sectional view illustrating a configuration of a piezoelectric device 10 according to a comparative example. FIG. 8 is a schematic diagram illustrating a vibration model according to the comparative example.

In the comparative example illustrated in FIG. 7, a whole surface of the piezoelectric device 10 may be directly connected to the display panel 20. Based on such a configuration, a displacement of the piezoelectric device 10 may be transferred to the display panel 20, and thus, the display panel 20 may act as a speaker. The vibration model according to the comparative example illustrated in FIG. 8, a plurality of springs S1 and S2 may be connected to both ends of a mass point representing the piezoelectric device 10 and the display panel 20. The piezoelectric device 10 having a mass m1 may be directly connected to the display panel 20 having a mass m2.

The spring S1 having a spring constant k1 may be connected to the piezoelectric device 10, and the spring S2 having a spring constant k2 may be connected to the display panel 20. The spring S1 may be implemented by modeling the elasticity of the piezoelectric device 10. The spring S2 may be implemented by modeling the elasticity of the display panel 20 or the elasticity of a member, which binds the display panel 20 such as a case or the like. Also, in the vibration model, both ends thereof may be a fixed end or a fixed member.

In the vibration model of the comparative example, the piezoelectric device 10 and the display panel 20 may be replaced with one mass point having a mass m1+m2. When a voltage is applied to the piezoelectric device 10, a force generated by the piezoelectric device 10 may vibrate all of the display panel 20 and the piezoelectric device 10 having the mass m1+m2. For example, the mass m1+m2 may be far greater than a mass m1. The force generated by the piezoelectric device 10 may affect an object having a very large mass, and thus, an acceleration applied to the piezoelectric device 10 and the first vibration member 20 by the force may be small. Accordingly, a displacement amount of the piezoelectric device 10 and the display panel 20 may be smaller, and in a configuration of the comparative example, the sound pressure of sound generated from the display panel 20 may be difficult to increase.

Figure 9:
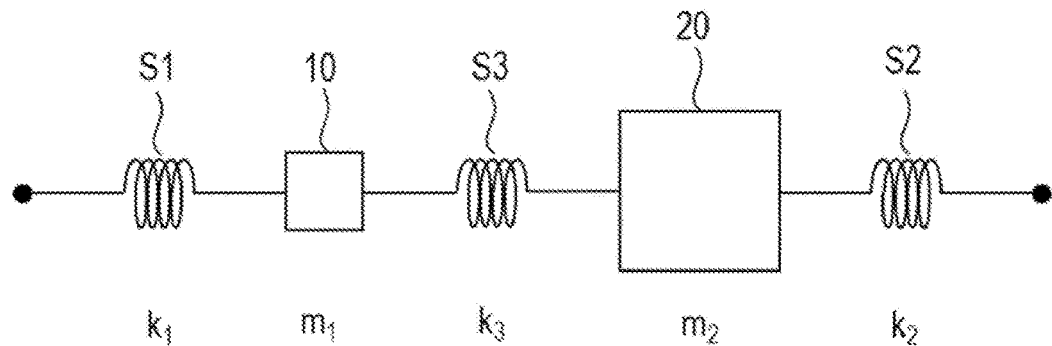
FIG. 9 is a schematic diagram illustrating a vibration model.

FIG. 9 is a schematic diagram illustrating a vibration model according to the premise technique. In the vibration model according to the premise technique illustrated in FIG. 9, a spring S3 having a spring constant k3 is connected between a mass point representing a display panel 20 and a piezoelectric device 10. The spring S3 may be implemented by modeling the elasticity of an elastic member 30. The piezoelectric device 10 having a mass m1 and the display panel 20 having a mass m2 is connected to through the spring S3.

In the vibration model according to the premise technique, the piezoelectric device 10 and the display panel 20 are independently displaced from each other. A force, generated when a voltage is applied to the piezoelectric device 10, vibrates the piezoelectric device 10 having the mass m1. For example, a mass of an object to which the force is applied may be less than the comparative example, and thus, an acceleration applied to the piezoelectric device 10 by the force may be greater than the comparative example. Therefore, the piezoelectric device 10 may be a resonance state with large displacement. Also, a displacement of the piezoelectric device 10 may be gradually transferred to the display panel 20 through the spring S3, and thus, like the comparative example, suppression of displacement by a mass of the display panel 20 may be difficult to occur. Accordingly, in an aspect of the premise technique, displacement may increase compared to the comparative example, and thus, a sound pressure level may be enhanced.

As described above, according to the premise technique, when the display panel 20 acts as a speaker, a sound pressure level of a sound generated by the display panel 20 may be enhanced.

Moreover, in the premise technique, a vibration source is the piezoelectric device 10, but a sound generating source is the display panel 20 which is large in mass and is low in natural frequency. Therefore, in the premise technique, a sound pressure level of a low-pitched sound band may be more enhanced than that from a configuration, where the piezoelectric device 10 directly generates a sound, or a configuration where a sound is generated by a member which connects the piezoelectric device 10 to a separate small vibration plate differing from the display panel 20 and has a high natural frequency.

As described above, according to the premise technique, a sound pressure level of a low-pitched sound band may be enhanced, but it may be required to improve a sound pressure level of each of a middle-pitched sound band and a high-pitched sound band. In an aspect of the present disclosure, as described below, noise, a high frequency sound, and a sound pressure level difference between different pitched sound bands may be controlled. Also, in the following description, the low-pitched sound band may be defined as a sound having a frequency of 300 Hz or less, the middle-pitched sound band may be defined as a sound having a frequency which is higher than a frequency of 300 Hz and is lower than or equal to a frequency of 1 kHz or less, and the high-pitched sound band may be defined as a sound having a frequency which is higher than a frequency of 1 kHz, but not limited thereto.

Figure 10:
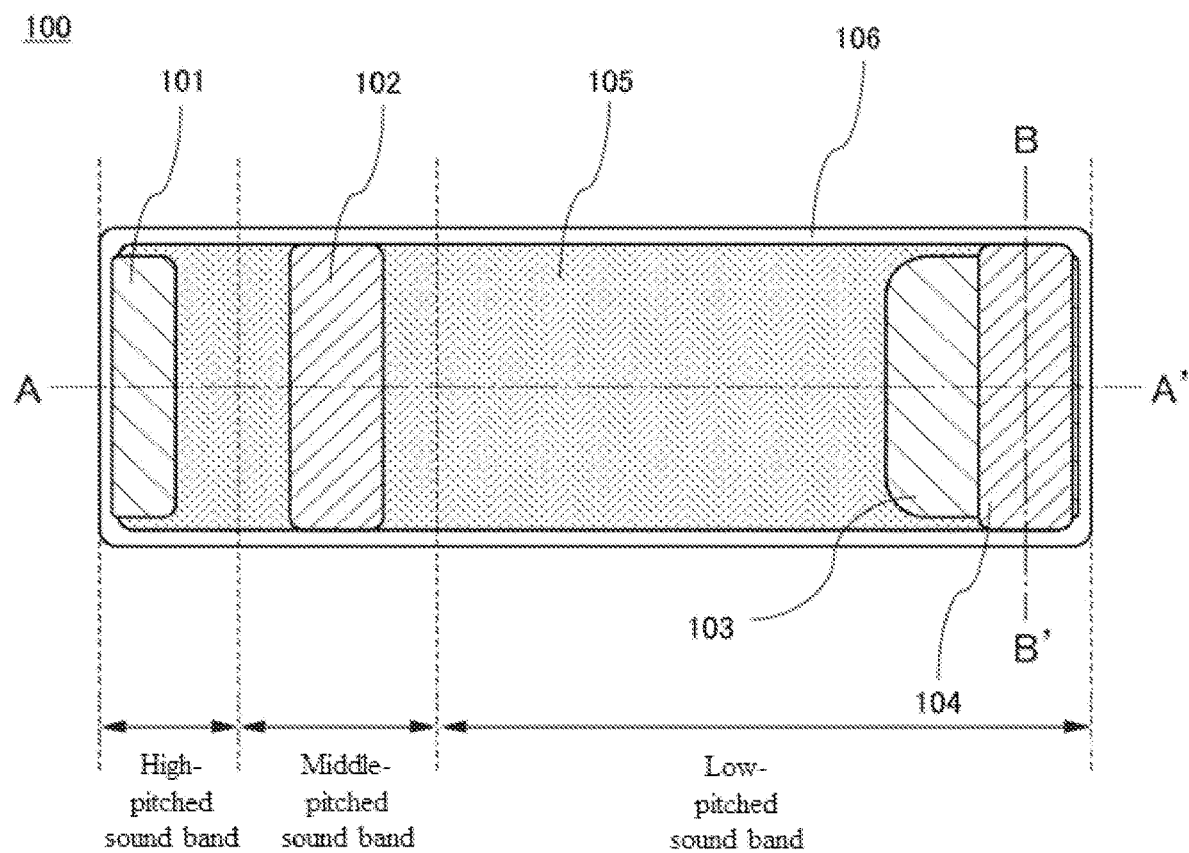
FIG. 10 illustrates a structure of a sound generator 100 according to an aspect of the present disclosure.
Figure 11:
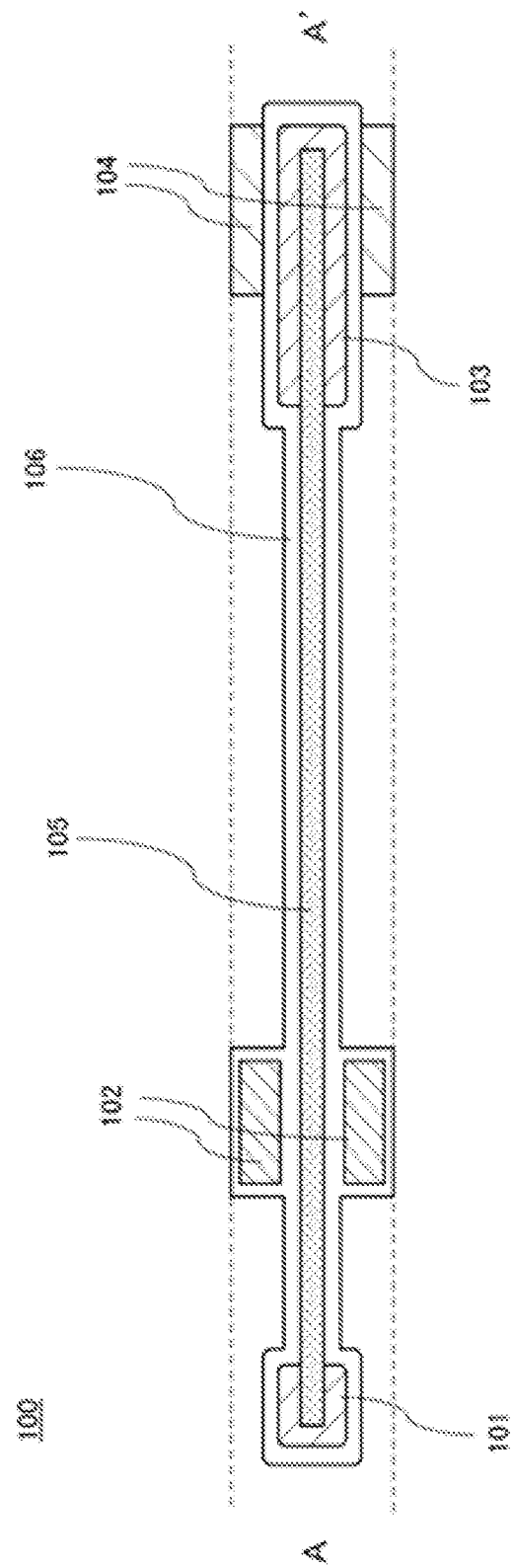
FIG. 11 is a cross-sectional view taken along line A-A' illustrated in FIG. 10.
Figure 12:
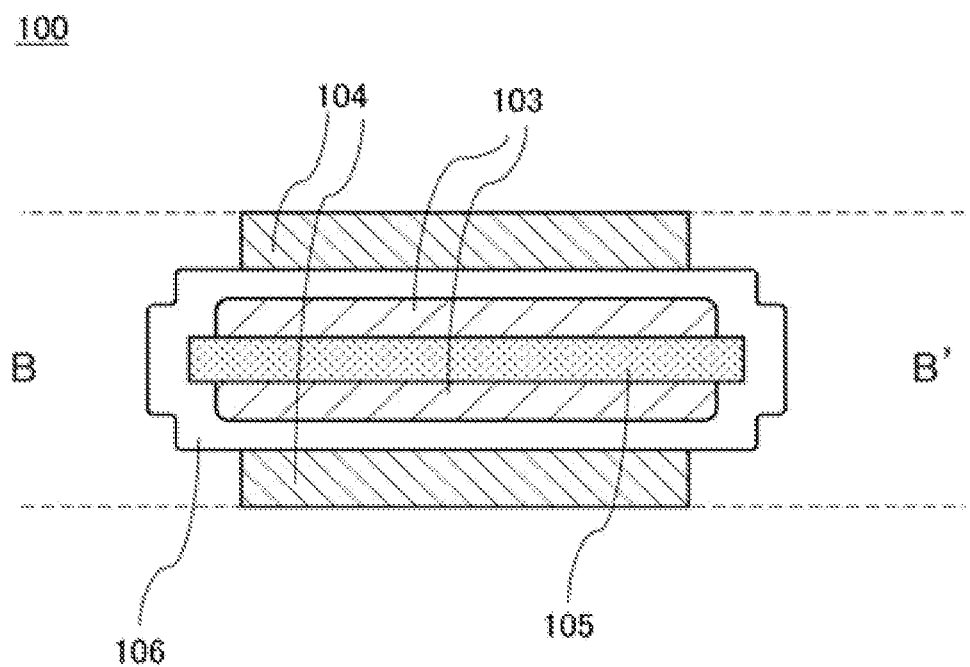
FIG. 12 is a cross-sectional view taken along line B-B' illustrated in FIG. 10.

FIG. 10 illustrates a structure of a sound generator 100 according to an aspect of the present disclosure. FIG. 11 is a cross-sectional view taken along line A-A' illustrated in FIG. 10. FIG. 12 is a cross-sectional view taken along line B-B' illustrated in FIG. 10.

With reference to FIGS. 10 to 12, the sound generator 100 may include a first weight member 101, a first elastic member 102, a second weight member 103, a second elastic member 104, and a piezoelectric device 105 having a rectangular shape, and a protection member 106. For example, the first and second weight members 101 and 103 may each be a weight, a balance weight, a mass, a mass member, or a vibration amplification member, but aspects of the present disclosure are limited thereto. The protection member 106 may be an elastic protection member or a flexible protection member, but aspects of the present disclosure are limited thereto.

The piezoelectric device 105 may have a rectangular shape including a long-side and a short-side. For example, the piezoelectric device 105 may include a first portion (or a second vibration area or a second sound area), a second portion (or a first vibration area or a first sound area), and a third portion (or a third vibration area or a third sound area) between the first portion and the second portion, with respect to a long-side direction, and the first to third portions may respectively generate sounds of different pitched sound bands.

The first weight member 101 may be a member which is provided at the first portion of the piezoelectric device 105 in the long-side direction and is provided for amplifying a vibration of the piezoelectric device 105. The second weight member 103 may be a member which is provided at the second portion of the piezoelectric device 105 in the long-side direction and is provided for amplifying a vibration of the piezoelectric device 105. The first elastic member 102 may include an elastic material and may include a material which is more difficult to deform than the second elastic member 104, and for example, may be an aggregation element where a material of the protection member 106 is solidly hardened. The second elastic member 104 may include an elastic material and may include an elastic material which is easier to deform than the first elastic member 102 or may include an elastic material which has a lower density than the first elastic member 102, and for example, may be a sponge.

The piezoelectric device 105 may correspond to the piezoelectric device 10 according to the premise technique and may be a device which, when a voltage based on a sound signal input thereto is applied thereto, may be displaced by an inverse piezoelectric effect to generate a sound in the sound generator 100.

The protection member 106 may be a member which has elasticity and covers the first weight member 101, the first elastic member 102, the second weight member 103, and the piezoelectric device 105 in the sound generator 100, and for example, may include silicon, rubber, silicon rubber, or the like, but aspects of the present disclosure are limited thereto. The protection member 106 may be a case which includes, for example, silicon rubber, and may include a notch (or a slit) which is provided at a portion thereof. The protection member 106 may cover or surround each of the first weight member 101, the first elastic member 102, the second weight member 103, and the piezoelectric device 105 which are inserted thereinto through the notch. For example, the first weight member 101, the first elastic member 102, the second weight member 103, and the piezoelectric device 105 may be provided as one body (or a single body) and may be inserted into the case (or the protection member 106) through the notch, and thus, may cover or wholly surround each of the first weight member 101, the first elastic member 102, the second weight member 103, and the piezoelectric device 105.

The first portion, where the first weight member 101 is disposed, of the piezoelectric device 105 in the long-side direction may be a high-pitched sound band generating portion which generates a sound having a high frequency (or a first frequency band). The second portion, where the second weight member 103 is disposed, of the piezoelectric device 105 in the long-side direction may be a low-pitched sound band generating portion which generates a sound having a low frequency (or a second frequency band). A portion where the first elastic member 102 is disposed may be a middle-pitched sound band generating portion which generates a sound having a middle frequency (or a third frequency band) between a sound generated by the high-pitched sound band generating portion and a sound generated by the low-pitched sound band generating portion. Also, the second elastic member 104 may be disposed at the low-pitched sound band generating portion, but aspects of the present disclosure are not limited thereto. Also, as illustrated in FIG. 10, in the sound generator 100, the low-pitched sound band generating portion may have a size (or an area) which is relatively greater than each of the high-pitched sound band generating portion and the middle-pitched sound band generating portion.

Figure 13:
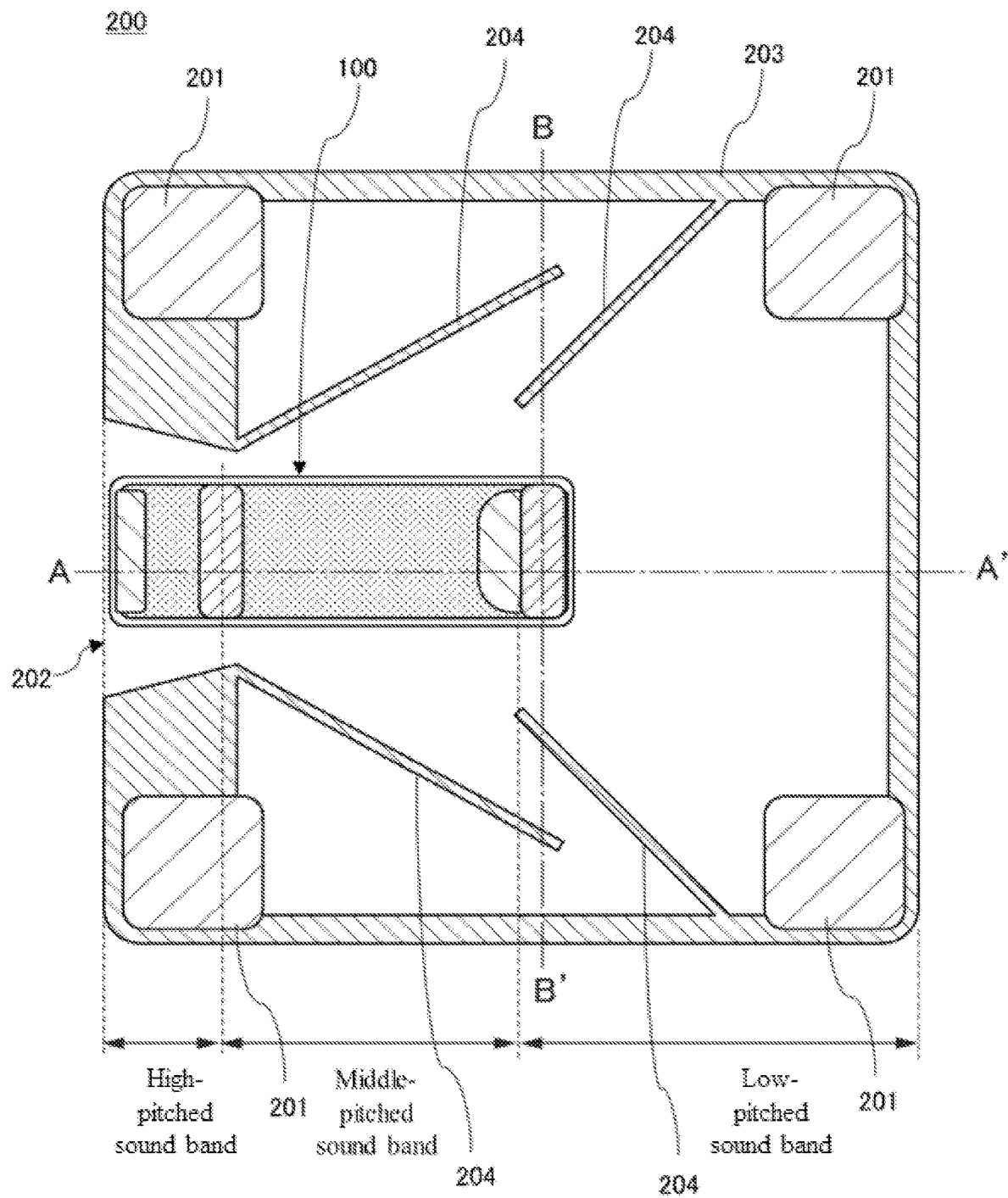
FIG. 13 illustrates an internal structure of a sound apparatus where the sound generator according to an aspect of the present disclosure.
Figure 14:
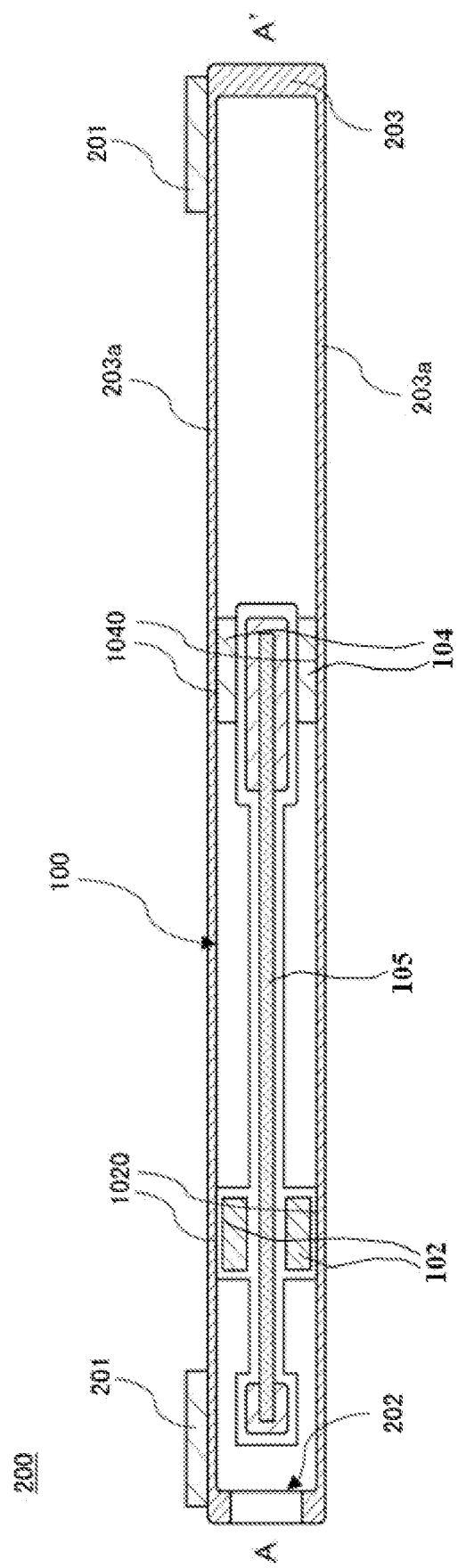
FIG. 14 is a cross-sectional view taken along line A-A' illustrated in FIG. 13.
Figure 15:
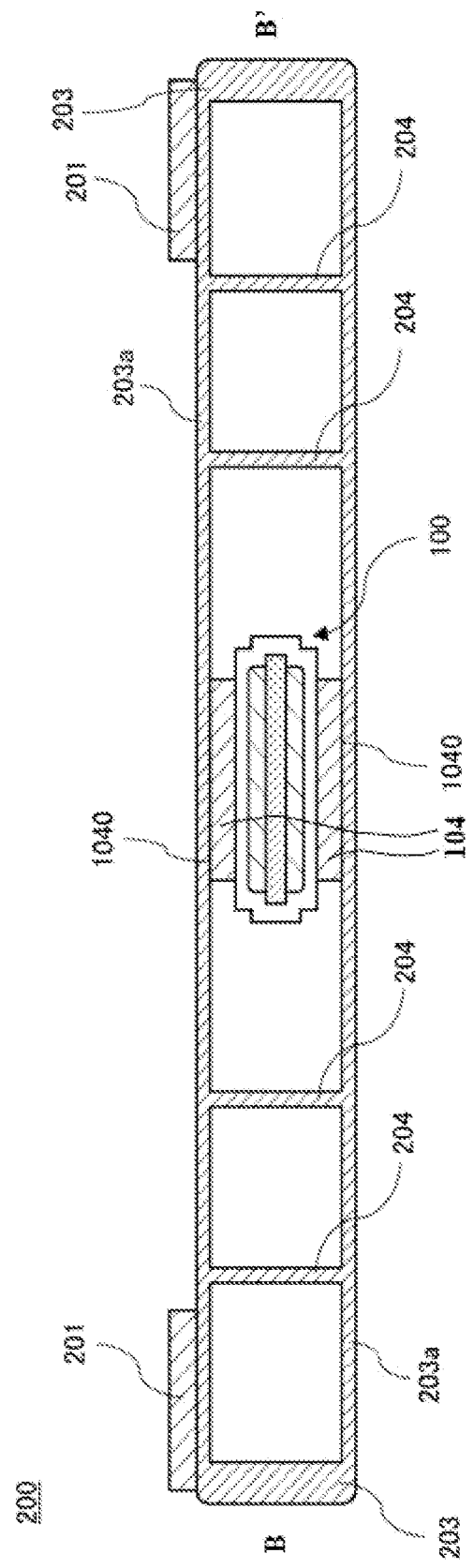
FIG. 15 is a cross-sectional view taken along line B-B' illustrated in FIG. 13.

FIG. 13 illustrates an internal structure of a sound apparatus 200 where the sound generator 100 according to an aspect of the present disclosure is disposed. FIG. 14 is a cross-sectional view taken along line A-A' illustrated in FIG. 13. FIG. 15 is a cross-sectional view taken along line B-B' illustrated in FIG. 13.

With reference to FIGS. 10 and 13 to 15, the sound apparatus 200 according to an aspect of the present disclosure may include the sound generator 100 including a piezoelectric device, an elastic member 201, an external frame (or a first frame) 203 including an opening portion 202, and an internal frame (or a second frame) 204. The sound apparatus 200 may be supported between two vibration plates 203a.

The middle-pitched sound band generating portion of the sound generator 100 may be connected or fixed to the two vibration plates 203a through the first elastic member 102 at a position which is closer to the first portion, where the first weight member 101 is provided, of the piezoelectric device 105 in the long-side direction than a center of the piezoelectric device 105 in the long-side direction. The elastic member 201 may include an elastic material, and for example, may be the same sponge as the second elastic member 104. The elastic member 201 may be disposed outward from the external frame 203.

The external frame 203 may output a sound, generated by the sound generator 100, to the outside. The external frame 203 may include a high-pitched sound band generating portion (or a first portion) which generates a high-pitched sound band, a low-pitched sound band generating portion (or a second portion) which generates a low-pitched sound band, and a middle-pitched sound band generating portion (or a third portion) which generates a middle-pitched sound band between the high-pitched sound band generating portion (or the first portion) and the low-pitched sound band generating portion (or the second portion).

Moreover, the two vibration plates 203a may be included in the external frame 203, or may be provided as two or more. The sound generator 100 may be disposed at at least one of the opening portion 202 disposed at the first portion of the external frame 203 and the third portion of the external frame 203. The external frame 203 with the opening portion 202 provided therein and the internal frame 204 may be provided as one body (or a single body), but aspects of the present disclosure are not limited thereto.

The internal frame 204 may be configured so that each of a sound generated by the middle-pitched sound band generating portion and a sound generated by the low-pitched sound band generating portion is introduced into a space formed in a portion of an inner portion of the sound apparatus 200 and reverberated.

In the sound generator 100, the first elastic member 102 may be attached to a vibration plate of the external frame 203 at an adhesive surface 1020 provided inside the middle-pitched sound band generating portion (or the third portion), and may be attached to a vibration plate of the external frame 203 at an adhesive surface 1040 provided inside the low-pitched sound band generating portion (or the second portion). A vibration plate 203a of a portion (or a third portion) of the adhesive surface 1020 may be a first vibration plate and a vibration plate 203a of a portion (or a second portion) of the adhesive surface 1040 may be a second vibration plate, and thus, the vibration plate 203a may be configured by a plurality of vibration plates.

Figure 16:
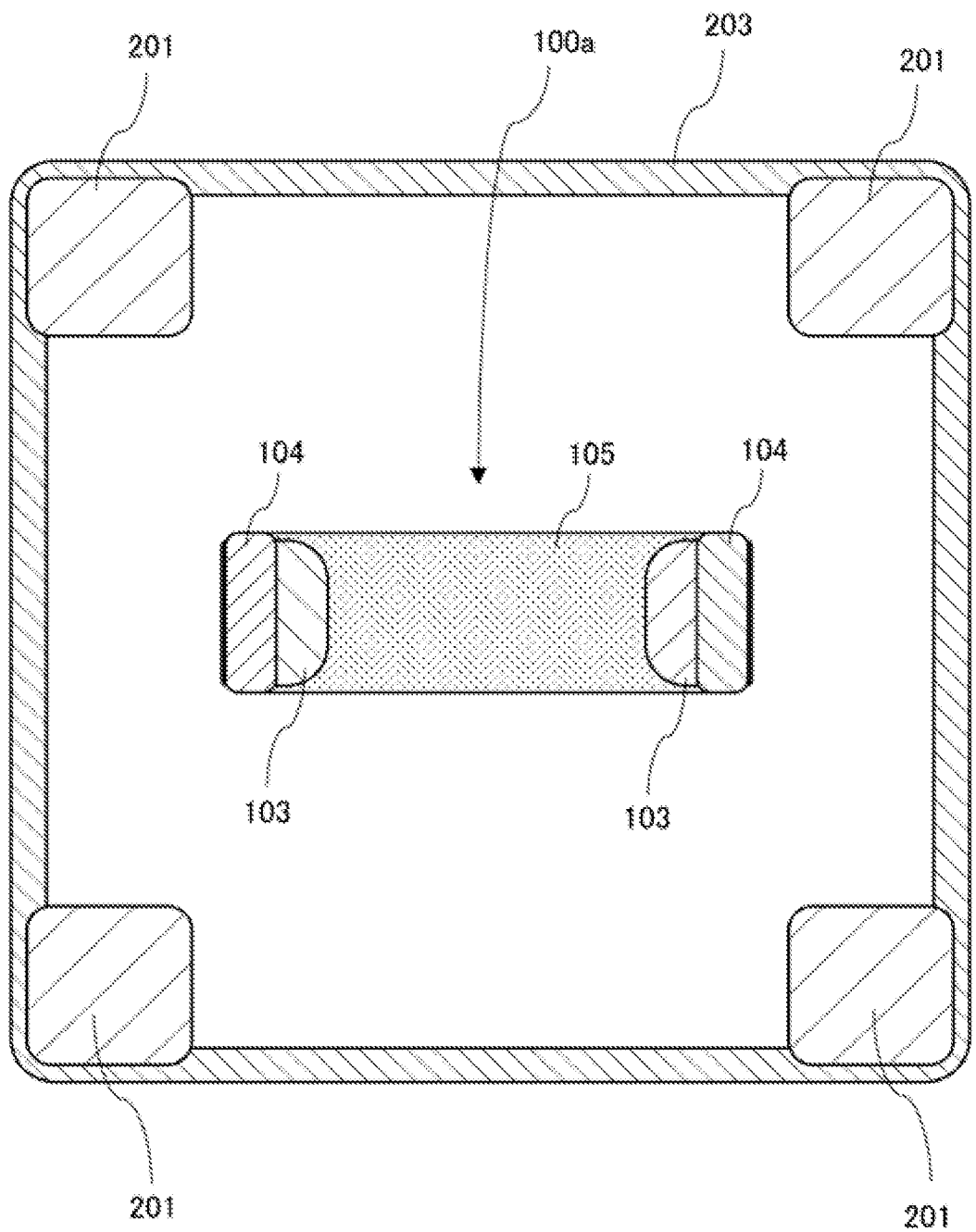
FIG. 16 illustrates an internal structure of a sound apparatus where a sound generator according to a comparative example.

FIG. 16 illustrates an internal structure of a sound apparatus 200a where a sound generator 100a according to a comparative example is disposed. The sound apparatus 200a may include the sound generator 100a including a piezoelectric device, an elastic member 201, and an external frame 203. The sound generator 100a may include two second weight members 103, two second elastic members 104, and a piezoelectric device 105. In the sound generator 100a, the two second weight members 103 and the two second elastic members 104 may be provided at both portions (or a first portion and a second portion) of the piezoelectric device 105 in a long-side direction.

Figure 17:
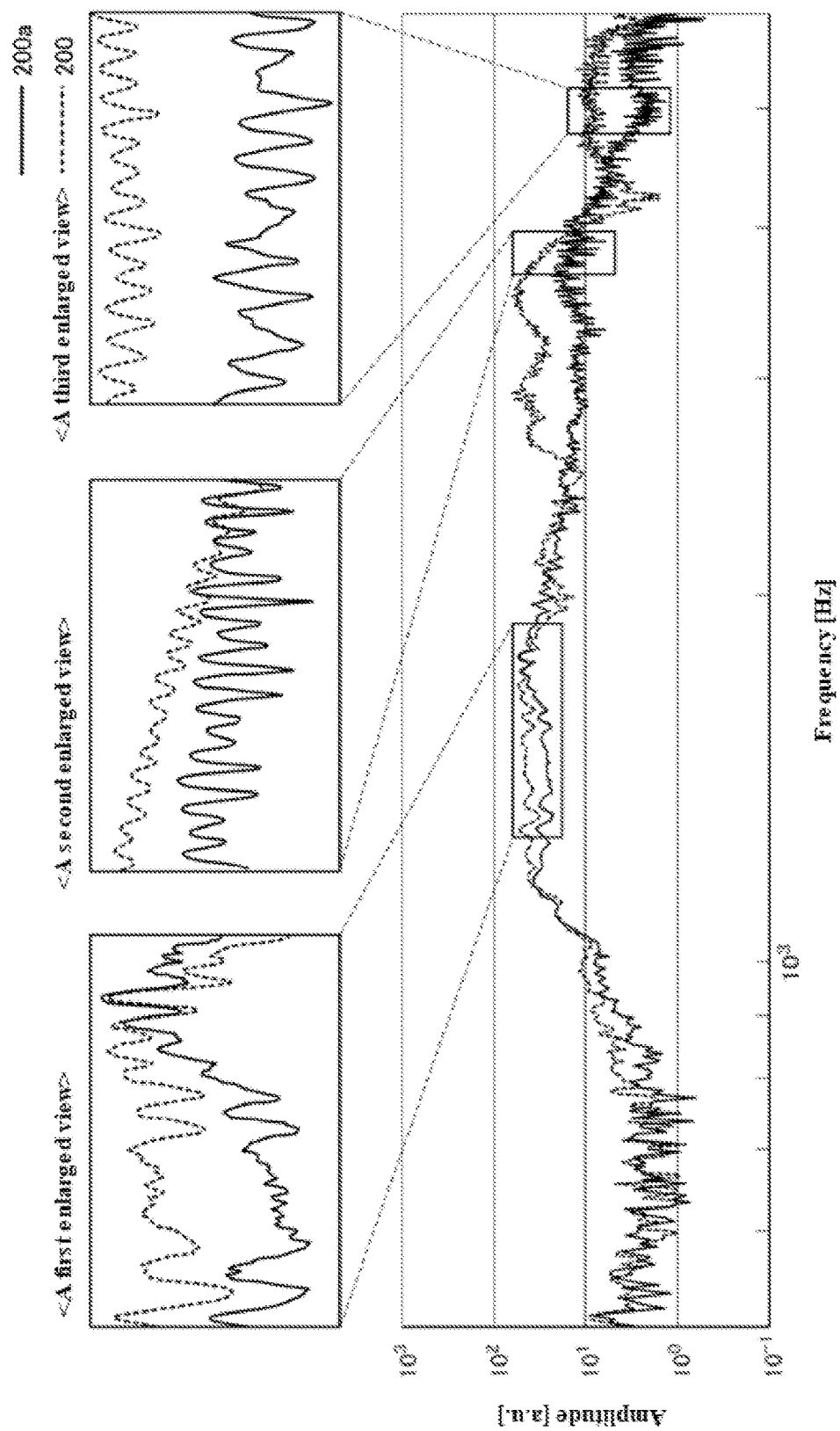
FIG. 17 is a characteristic diagram showing a result obtained by comparing a sound characteristic of the sound apparatus, illustrated in FIG. 13, with a sound characteristic of the sound apparatus illustrated in FIG. 16.

FIG. 17 is a characteristic diagram showing a result obtained by comparing a sound characteristic of the sound apparatus 200, illustrated in FIG. 13, with a sound characteristic of the sound apparatus 200a illustrated in FIG. 16. In FIG. 17, the abscissa axis represents a frequency, and the ordinate axis represents an amplitude. In the characteristic diagram of FIG. 17, a first enlarged view, a second enlarged view, and a third enlarged view illustrate the enlargements of three portions. In the first enlarged view, the second enlarged view, and the third enlarged view, a characteristic in a middle-pitched sound band or a high-pitched sound band is shown, but in all enlarged views, a sound pressure level may increase (particularly, a sound pressure level in a high-pitched sound band may increase) and a sound pressure level difference between the middle-pitched sound band and the high-pitched sound band may be reduced. Also, in the second enlarged view and the third enlarged view, it may be seen that, as an increase or a reduction in amplitude of a variation of a frequency in the high-pitched sound band is reduced, a high frequency sound is reduced and noise in the high-pitched sound band is reduced. As illustrated in FIG. 17, in the sound apparatus 200 illustrated in FIG. 13, noise in the high-pitched sound band may be reduced, the high frequency sound may be reduced, and a sound pressure level difference between the middle-pitched sound band and the high-pitched sound band may be reduced.

Moreover, a sound apparatus according to an aspect of the present disclosure is not limited to a configuration (or a structure) illustrated in FIGS. 13 to 15, and a modification aspect of the sound apparatus according to an aspect of the present disclosure will be described below.

Figure 18:
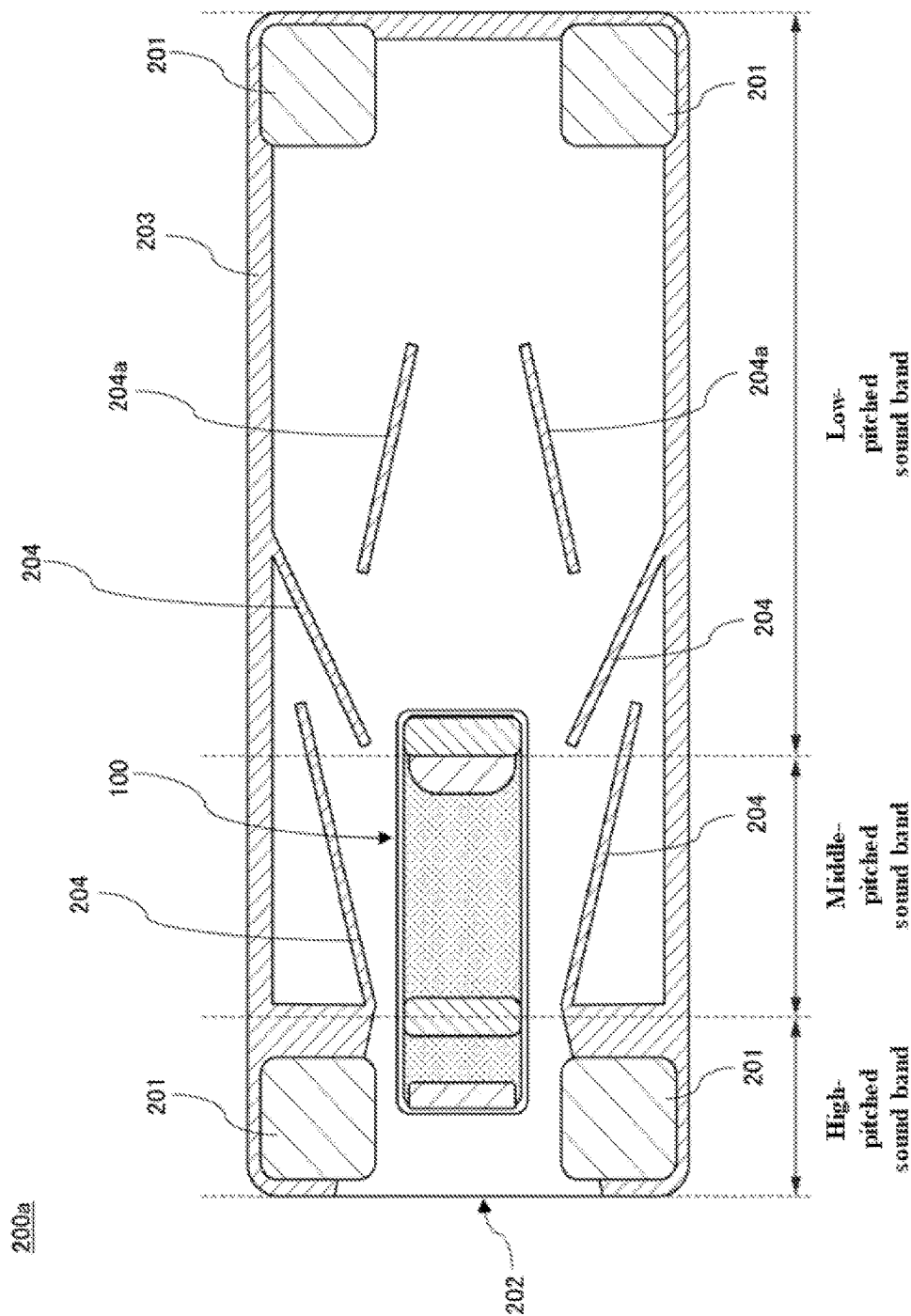
FIG. 18 illustrates an internal structure of a sound apparatus according to a first modification aspect where the sound generator according to an aspect of the present disclosure.

FIG. 18 illustrates an internal structure of a sound apparatus 200a according to a first modification aspect where the sound generator 100 according to an aspect of the present disclosure is disposed.

With reference to FIG. 18, the sound apparatus 200a according to the first modification aspect of the present disclosure may include a sound generator 100 including a piezoelectric device, an elastic member 201, an external frame 203 including an opening portion 202, and a plurality of internal frames 204 and 204a. Comparing with the sound apparatus 200 according to an aspect of the present disclosure, the sound apparatus 200a according to the first modification aspect of the present disclosure has a difference in that the internal frame 204a is additionally provided in the sound apparatus 200, and the other elements are the same. Therefore, repetitive descriptions of the same elements are omitted.

Two internal frames 204a may be disposed at an area of a low-pitched sound band and may be configured so that a path of a sound generated by the sound generator 100 narrows in a direction distancing from an area of the middle-pitched sound band and is reverberated in an area distancing from the area of the middle-pitched sound band. According to a configuration illustrated in FIG. 18, a sound pressure level characteristic of the low-pitched sound band may be enhanced.

Figure 19:
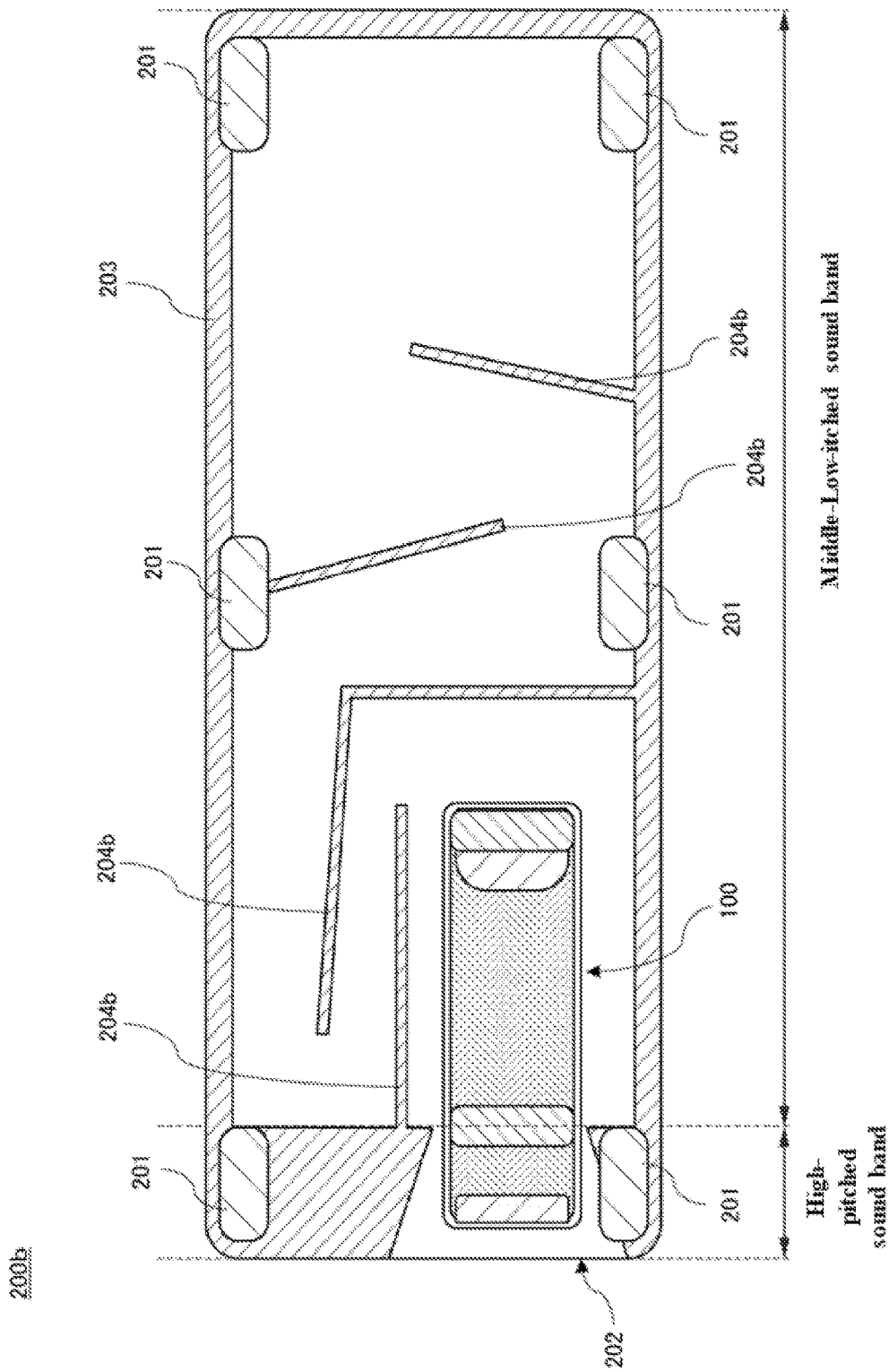
FIG. 19 illustrates an internal structure of a sound apparatus according to a second modification aspect where the sound generator according to an aspect of the present disclosure is disposed.

FIG. 19 illustrates an internal structure of a sound apparatus 200b according to a second modification aspect where the sound generator 100 according to an aspect of the present disclosure is disposed.

With reference to FIG. 19, the sound apparatus 200b according to the second modification aspect of the present disclosure may include a sound generator 100 including a piezoelectric device, an elastic member 201, an external frame 203 including an opening portion 202, and an internal frame 204b. Comparing with the sound apparatus 200 according to an aspect of the present disclosure, the sound apparatus 200b according to the second modification aspect of the present disclosure has a difference in that the internal frame 204b is provided instead of the internal frame 204 of the sound apparatus 200, and the other elements are the same. Therefore, repetitive descriptions of the same elements are omitted.

The internal frame 204b may be disposed at an area of the middle-low-pitched sound band and may be configured so that a path of a sound generated by the sound generator 100 bypasses an area of the middle-low-pitched sound band at least once and is reverberated at the area of the middle-pitched sound band. According to a configuration illustrated in FIG. 19, a sound pressure level characteristic of the low-pitched sound band may be enhanced.

Figure 20:
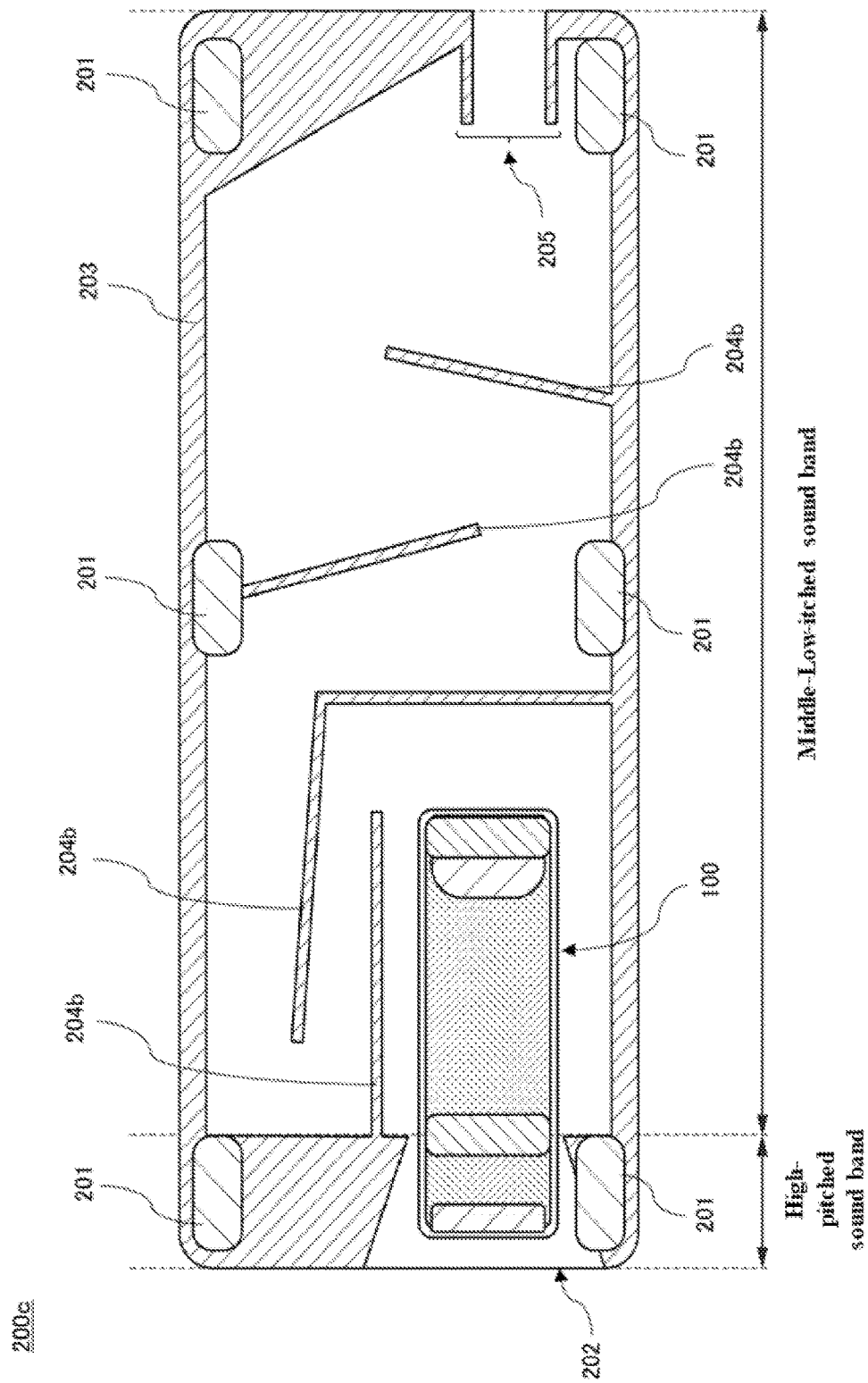
FIG. 20 illustrates an internal structure of a sound apparatus according to a third modification aspect where the sound generator according to an aspect of the present disclosure.

FIG. 20 illustrates an internal structure of a sound apparatus 200c according to a third modification aspect where the sound generator 100 according to an aspect of the present disclosure is disposed.

With reference to FIG. 20, the sound apparatus 200c according to the first modification aspect of the present disclosure may include a sound generator 100 including a piezoelectric device, an elastic member 201, an external frame 203 including an opening portion 202 and a port 205, and an internal frame 204a. Comparing with the sound apparatus 200b according to the second modification aspect of the present disclosure, the sound apparatus 200c according to the third modification aspect of the present disclosure has a difference in that the port 205 is provided at the external frame 203, and the other elements are the same. Therefore, repetitive descriptions of the same elements are omitted.

The port 205 may be provided for enhancing a sound pressure level of a low-pitched sound band. In a closed type speaker, a rear surface (or a backside) of the speaker may be closed and an air room may be provided, but when a port (or a hole) is formed at the closed air room, a resonance frequency may be adjusted based on a capacity of the air room, a cross-sectional area of an opening of the port 205, and a length of a duct provided at the air room of the port 205, and thus, a speaker where a low-pitched sound band is emphasized may be implemented. Therefore, the port 205 may be configured at the external frame 203 to communicate with a space (or an air room) surrounded by the external frame 203 and two vibration plates 203a. For example, a shape of the opening of the port 205 is not limited to a specific shape and may be circular or oval or may be tetragonal or polygonal. The port 205 may be configured at the external frame 203 of an area of a middle-low-pitched sound band so as to enhance a sound pressure level of a low-pitched sound band. For example, the resonance frequency may be adjusted by the port 205, and thus, the sound pressure level of the low-pitched sound band may be enhanced. In a configuration illustrated in FIG. 20, a sound pressure level characteristic of the low-pitched sound band may be enhanced.

Figure 21:
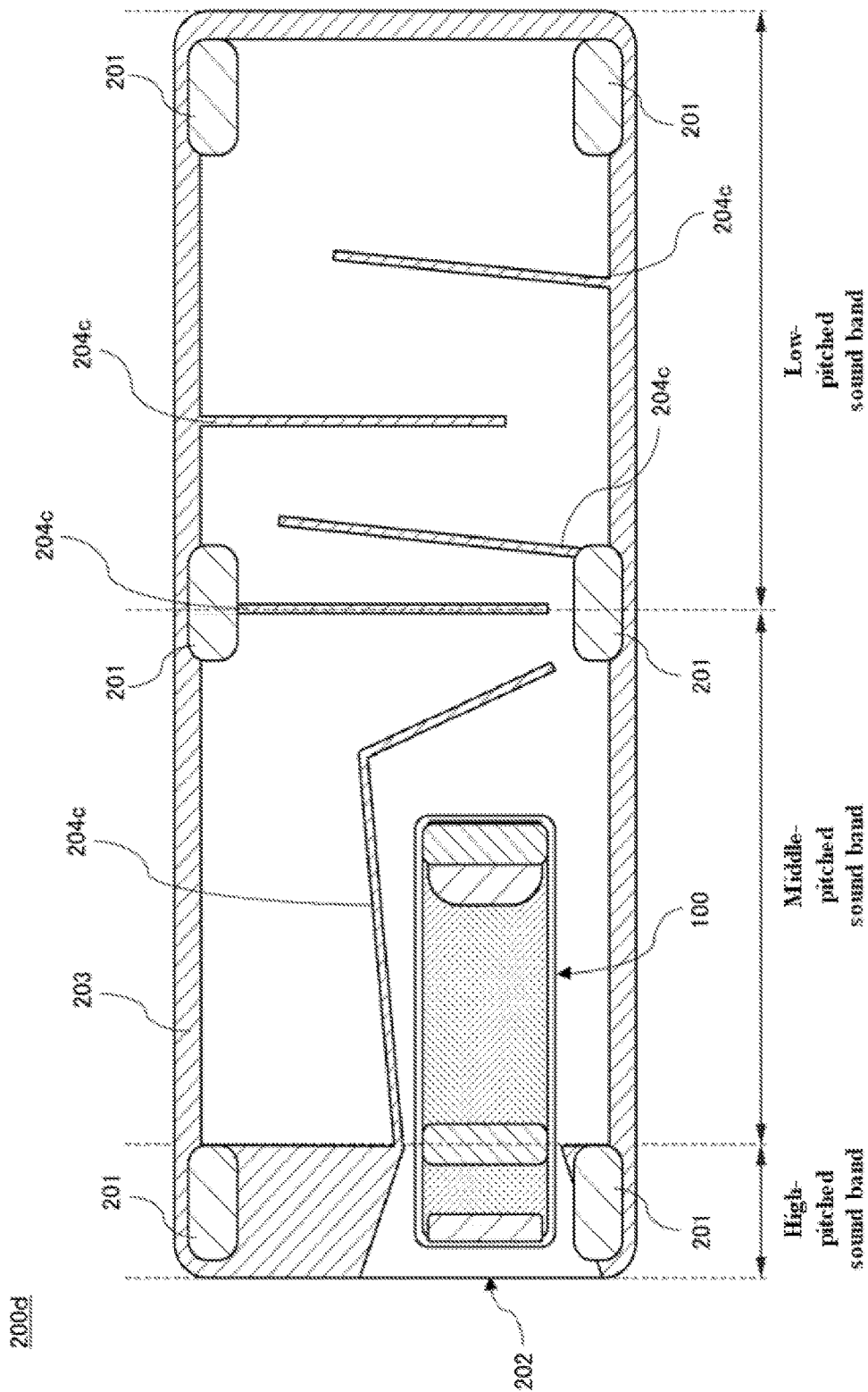
FIG. 21 illustrates an internal structure of a sound apparatus according to a fourth modification aspect where the sound generator according to an aspect of the present disclosure.

FIG. 21 illustrates an internal structure of a sound apparatus 200d according to a fourth modification aspect where the sound generator 100 according to an aspect of the present disclosure is disposed.

With reference to FIG. 21, the sound apparatus 200d according to the fourth modification aspect of the present disclosure may include a sound generator 100 including a piezoelectric device, an elastic member 201, an external frame 203 including an opening portion 202, and an internal frame 204c. Comparing with the sound apparatus 200 according to an aspect of the present disclosure, the sound apparatus 200d according to the fourth modification aspect of the present disclosure has a difference in that the internal frame 204c is provided instead of the internal frame 204 of the sound apparatus 200, and the other elements are the same. Therefore, repetitive descriptions of the same elements are omitted.

The internal frame 204c may be disposed at each of an area of the middle-pitched sound band and an area of the low-pitched sound band and may be configured so that a path of a sound generated by the sound generator 100 is reverberated to the area of the middle-pitched sound band and the path of the sound bypasses to the area of the low-pitched sound band and is reverberated at an area distancing from the area of the middle-pitched sound band. According to a configuration illustrated in FIG. 21, a sound pressure level of a middle-pitched sound band and a sound pressure level of a low-pitched sound band may be enhanced.

Figure 22:
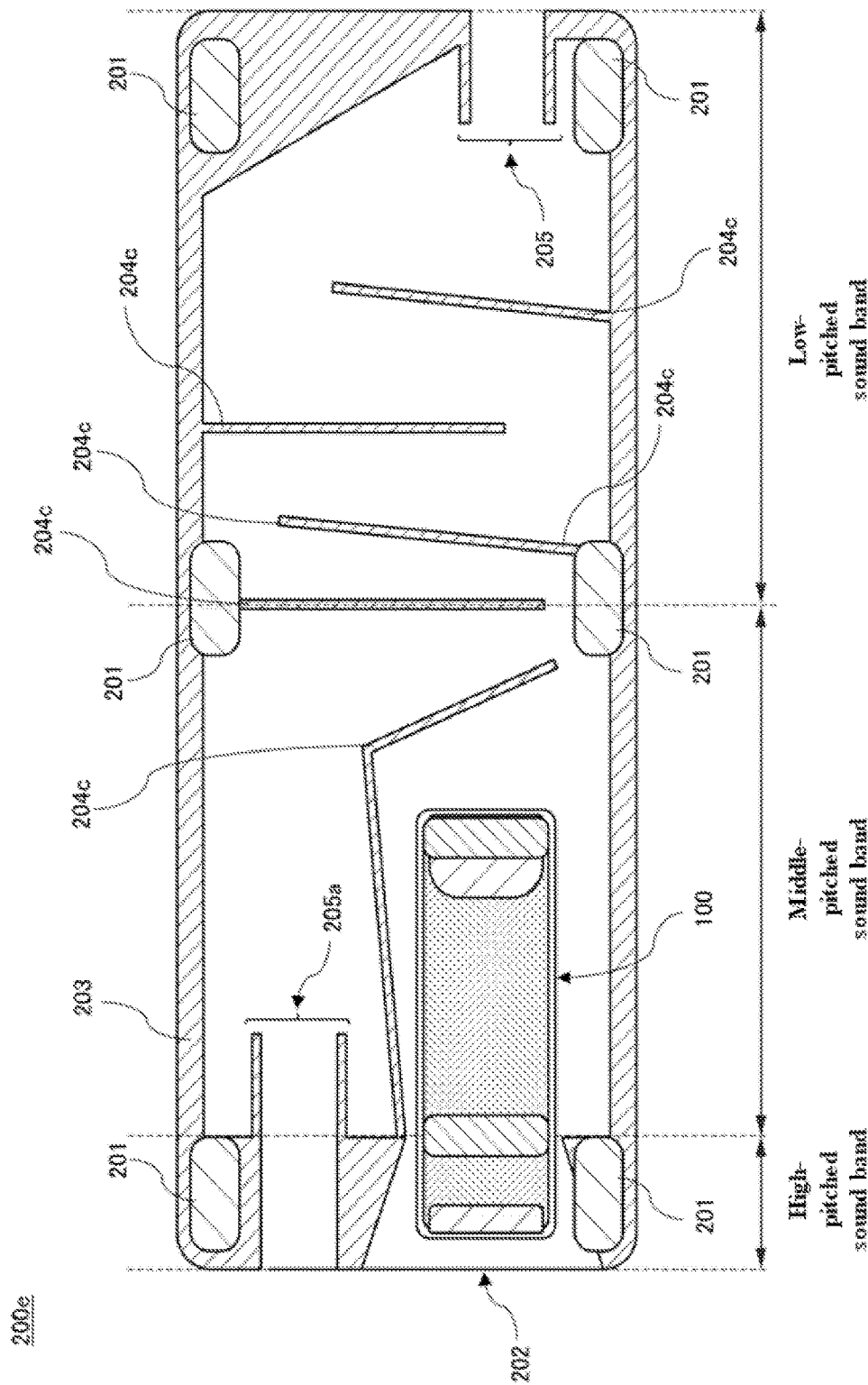
FIG. 22 illustrates an internal structure of a sound apparatus according to a fifth modification aspect where the sound generator according to an aspect of the present disclosure.

FIG. 22 illustrates an internal structure of a sound apparatus 200e according to a fifth modification aspect where the sound generator 100 according to an aspect of the present disclosure is disposed.

With reference to FIG. 22, the sound apparatus 200e according to the fifth modification aspect of the present disclosure may include a sound generator 100 including a piezoelectric device, an elastic member 201, an external frame 203 including an opening portion 202 and a plurality of ports 205 and 205a, and an internal frame 204c. Comparing with the sound apparatus 200d according to the fourth modification aspect of the present disclosure, the sound apparatus 200e according to the fifth modification aspect of the present disclosure has a difference in that the ports 205 and 205a are provided at the external frame 203 and the other elements are the same, and thus, repetitive descriptions of the same elements are omitted.

The port 205 (or a first port) may be configured at the external frame 203 of an area of the low-pitched sound band so as to enhance a sound pressure level of a low-pitched sound band, and the port 205a (or a second port) may be configured at the external frame 203 of an area of the middle-pitched sound band so as to enhance a sound pressure level of a middle-pitched sound band. For example, the port 205 may be configured identically to the port 205 illustrated in FIG. 20. Except for that the port 205a is provided at the external frame 203 adjacent to the opening portion 202, the port 205a may be configured identically to the port 205. According to a configuration illustrated in FIG. 22, a sound pressure level of the middle-pitched sound band and a sound pressure level of the low-pitched sound band may be enhanced.

Figure 23:
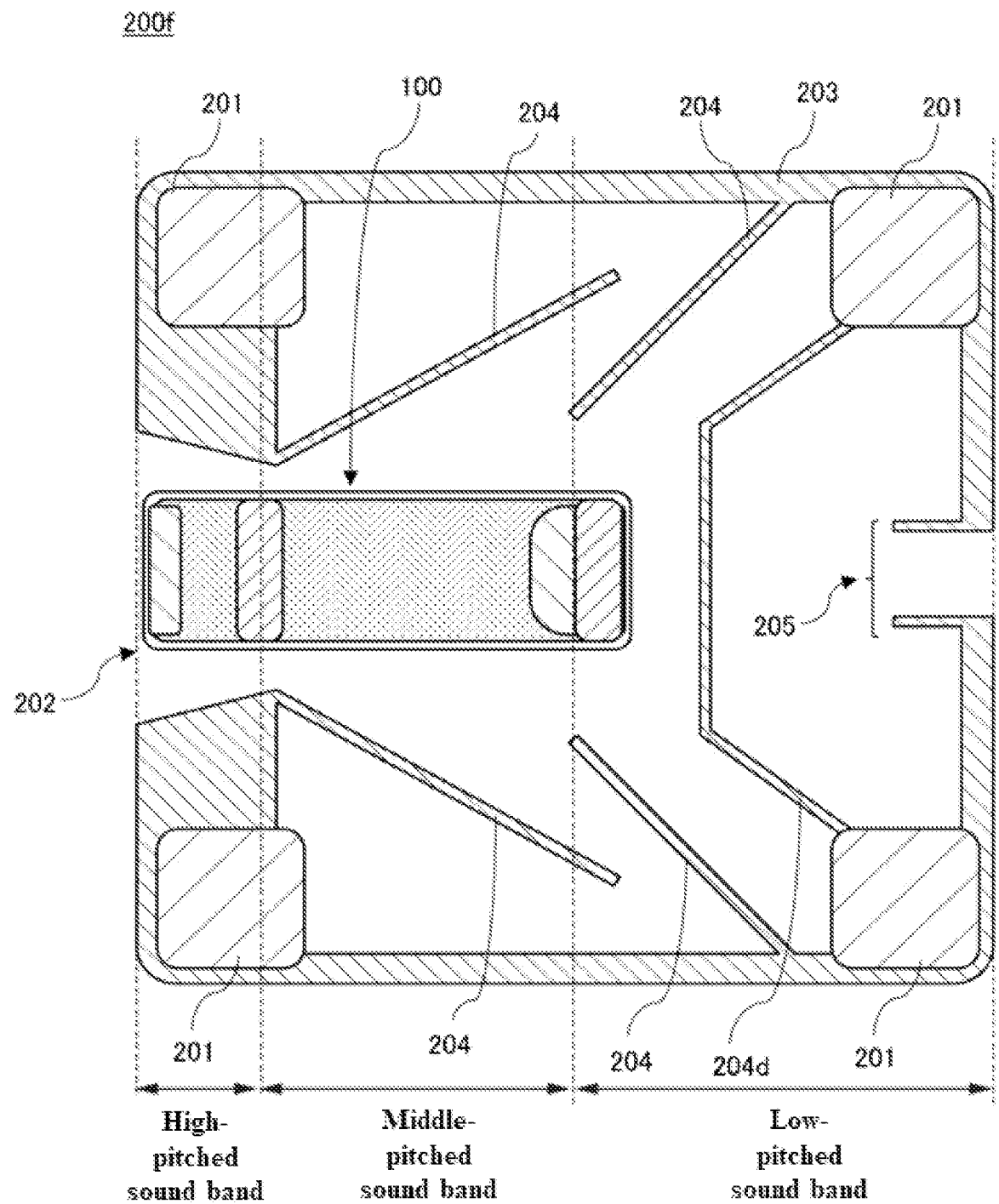
FIG. 23 illustrates an internal structure of a sound apparatus according to a sixth modification aspect where the sound generator according to an aspect of the present disclosure.

FIG. 23 illustrates an internal structure of a sound apparatus 200f according to a sixth modification aspect where the sound generator 100 according to an aspect of the present disclosure is disposed.

With reference to FIG. 23, the sound apparatus 200f according to the sixth modification aspect of the present disclosure may include a sound generator 100 including a piezoelectric device, an elastic member 201, an external frame 203 including an opening portion 202 and a port 205, and a plurality of internal frames 204 and 204d. Comparing with the sound apparatus 200 according to an aspect of the present disclosure, the sound apparatus 200f according to the sixth modification aspect of the present disclosure has only a difference in that the internal frame 204d is added and the port is provided at the external frame 203, and the other elements are the same. Therefore, repetitive descriptions of the same elements are omitted.

The internal frame 204d may be disposed at an area of the low-pitched sound band, may be disposed in approximately parallel with the internal frame 204 provided at the area of the low-pitched sound band, and may be configured so that a path of a sound generated by the sound generator 100 bypasses the area of the low-pitched sound band so as to face a corner portion of the external frame 203 and is reverberated at an area distancing from an area of the middle-pitched sound band. According to a configuration illustrated in FIG. 23, a sound pressure level of a low-pitched sound band may be enhanced.

Figure 24:
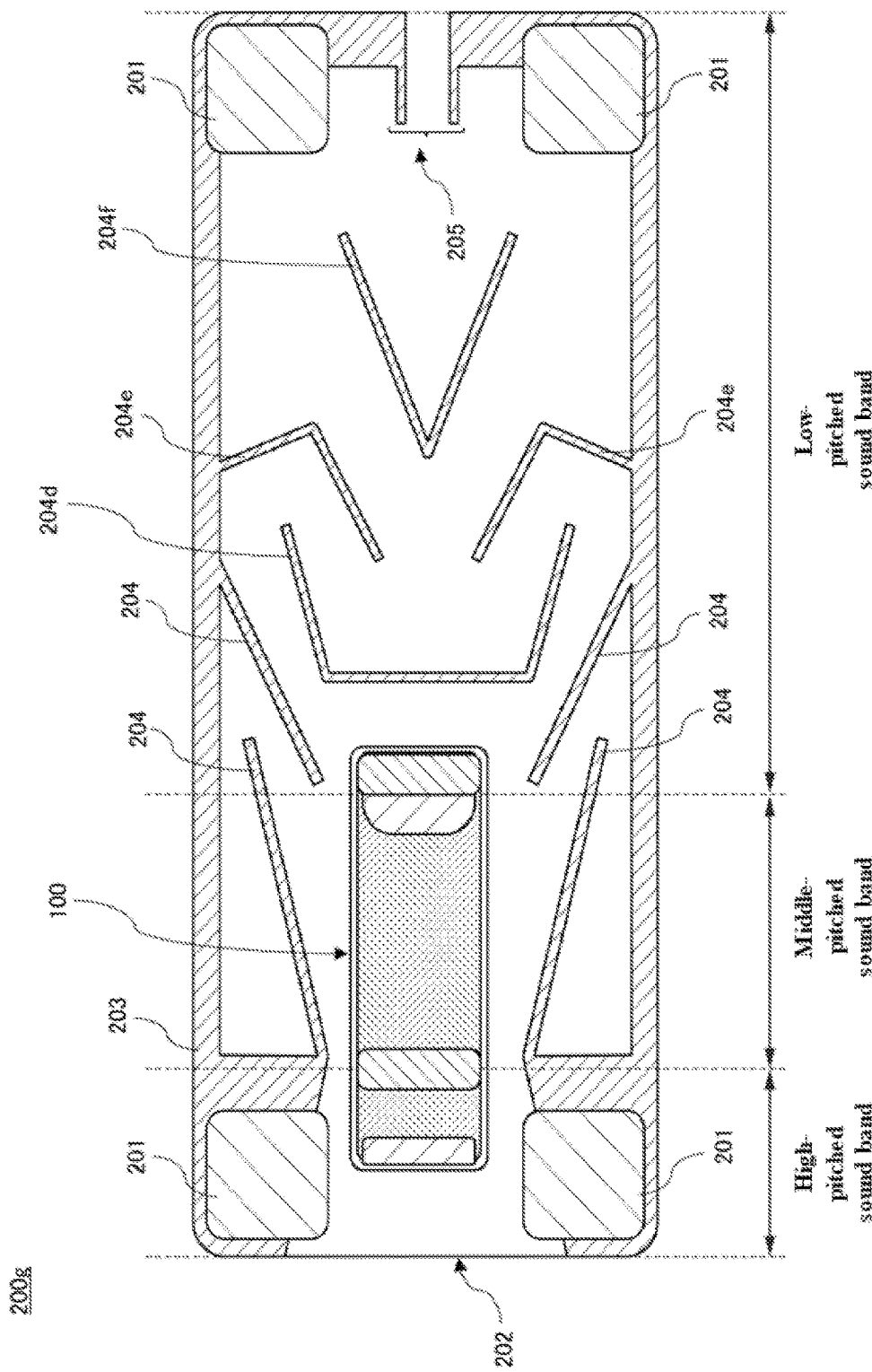
FIG. 24 illustrates an internal structure of a sound apparatus according to a seventh modification aspect where the sound generator according to an aspect of the present disclosure.

FIG. 24 illustrates an internal structure of a sound apparatus 200g according to a seventh modification aspect where the sound generator 100 according to an aspect of the present disclosure is disposed.

With reference to FIG. 24, the sound apparatus 200g according to the seventh modification aspect of the present disclosure may include a sound generator 100 including a piezoelectric device, an elastic member 201, an external frame 203 including an opening portion 202 and a port 205, and a plurality of internal frames 204, 204d, 204e, and 204f. Comparing with the sound apparatus 200f according to the sixth modification aspect of the present disclosure, the sound apparatus 200g according to the seventh modification aspect of the present disclosure has only a difference in that the internal frames 204e and 204f are additionally provided, and the other elements are the same. Therefore, repetitive descriptions of the same elements are omitted.

The internal frame 204e may be disposed at an area of the low-pitched sound band. A portion of the internal frame 204e may be configured to block a path of a sound passing through a region between the internal frame 204 and the internal frame 204d so that a path of a sound generated by the sound generator 100 bypasses and reverberates, and another portion of the internal frame 204e may be configured to be approximately parallel to a portion of the internal frame 204d disposed at the area of the low-pitched sound band. The internal frame 204f may be provided in approximately parallel with another portion of the internal frame 204e so that a path of a sound generated by the sound generator 100 bypasses and reverberates. The port 205 may be provided at the external frame 203 of the area of the low-pitched sound band, thereby enhancing a sound pressure level of a low-pitched sound band. According to a configuration illustrated in FIG. 24, the sound pressure level of the low-pitched sound band may be enhanced.

Figure 25:
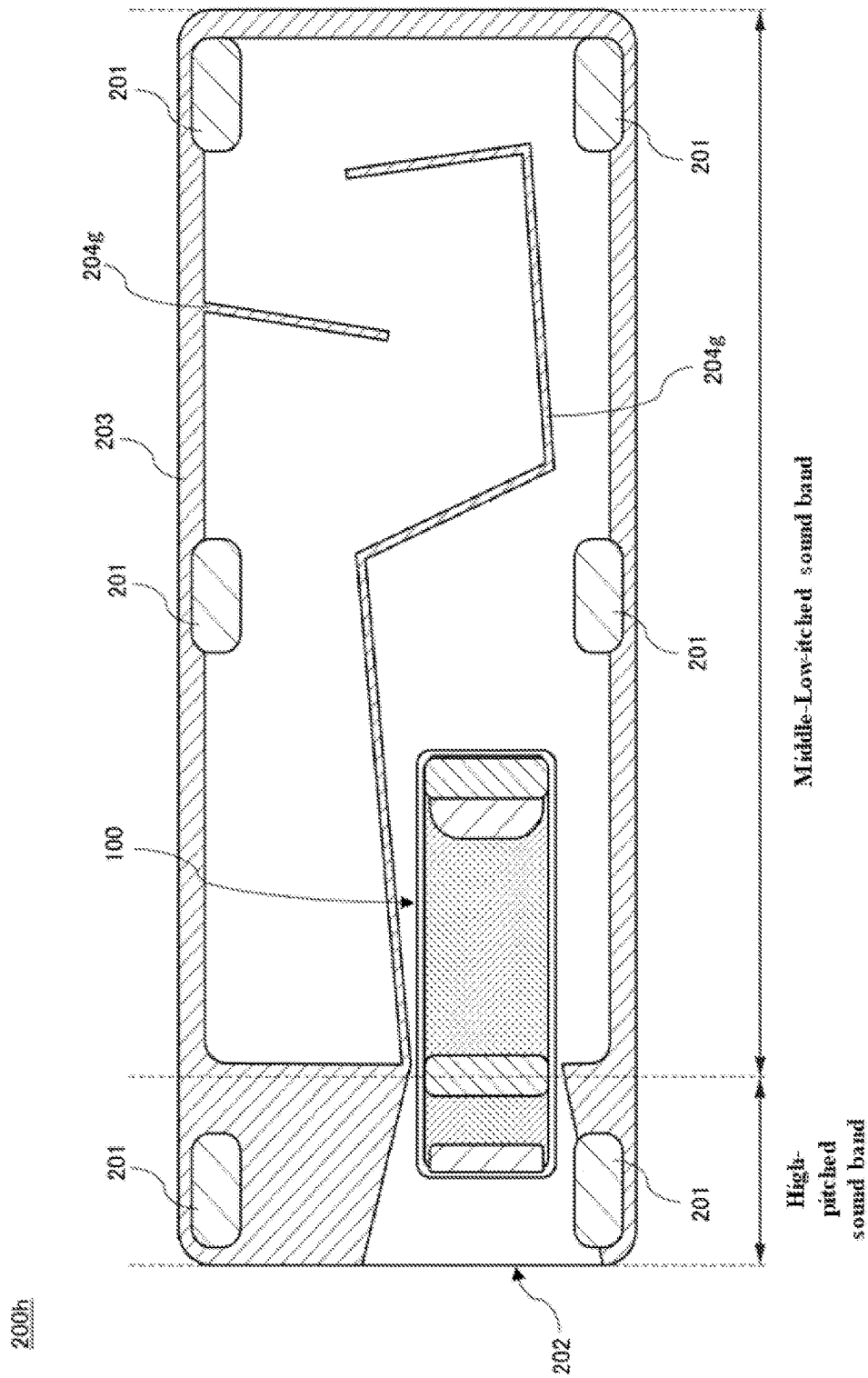
FIG. 25 illustrates an internal structure of a sound apparatus according to an eighth modification aspect where the sound generator according to an aspect of the present disclosure.

FIG. 25 illustrates an internal structure of a sound apparatus 200h according to an eighth modification aspect where the sound generator 100 according to an aspect of the present disclosure is disposed.

With reference to FIG. 25, the sound apparatus 200h according to the eighth modification aspect of the present disclosure may include a sound generator 100 including a piezoelectric device, an elastic member 201, an external frame 203 including an opening portion 202, and an internal frame 204g. Comparing with the sound apparatus 200 according to an aspect of the present disclosure, the sound apparatus 200g according to the eighth modification aspect of the present disclosure has a difference in that the internal frame 204g is provided instead of the internal frame 204 of the sound apparatus 200, and the other elements are the same. Therefore, repetitive descriptions of the same elements are omitted.

The internal frame 204g may be disposed at an area of the middle-pitched sound band and may be configured so that a path of a sound generated by the sound generator 100 bypasses along the external frame 203 and is reverberated. According to a configuration illustrated in FIG. 25, a sound pressure level characteristic of a middle-pitched sound band and a sound pressure level characteristic of a low-pitched sound band may be enhanced.

Figure 26:
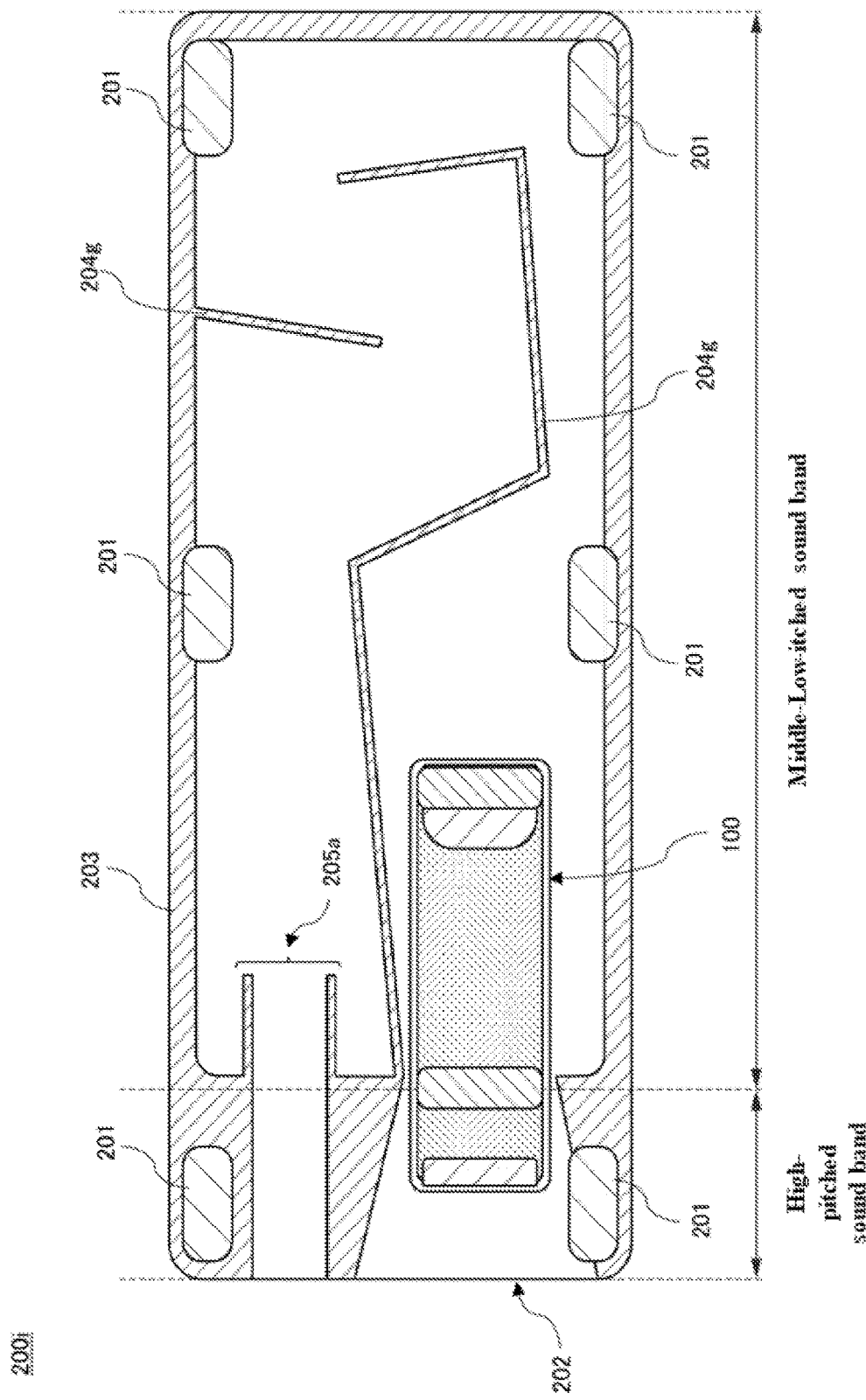
FIG. 26 illustrates an internal structure of a sound apparatus according to a ninth modification aspect where the sound generator according to an aspect of the present disclosure.

FIG. 26 illustrates an internal structure of a sound apparatus 200i according to a ninth modification aspect where the sound generator 100 according to an aspect of the present disclosure is disposed.

With reference to FIG. 26, the sound apparatus 200i according to the ninth modification aspect of the present disclosure may include a sound generator 100 including a piezoelectric device, an elastic member 201, an external frame 203 including an opening portion 202 and a port 205a, and an internal frame 204g. Comparing with the sound apparatus 200h according to the eighth modification aspect of the present disclosure, the sound apparatus 200i according to the ninth modification aspect of the present disclosure has only a difference in that the port 205a is provided at the external frame 203 of the sound apparatus 200h, and the other elements are the same. Therefore, repetitive descriptions of the same elements are omitted.

The port 205a may be configured to enhance a sound pressure level characteristic of a middle-pitched sound band and a sound pressure level characteristic of a low-pitched sound band. For example, the port 205a may be provided at the external frame 203 adjacent to the opening portion 203. According to a configuration illustrated in FIG. 26, a sound pressure level characteristic of a middle-pitched sound band and a sound pressure level characteristic of a low-pitched sound band may be enhanced.

Moreover, in the configurations illustrated in FIGS. 18 to 26, a sound pressure level may be enhanced for each pitched sound band, and thus, the balance of each pitched sound band may be adjusted. As described above, an aspect and modification aspects of the present disclosure may implement a sound apparatus which may adjust noise, a harmonic distortion sound, and a sound pressure level difference between different sound bands and may enhance sound quality.

A sound generator and a sound apparatus according to the present disclosure will be described below.

A sound generator according to an aspect of the present disclosure may include a piezoelectric device, a high-pitched sound band generating portion provided at one end of the piezoelectric device in a long-side direction, a low-pitched sound band generating portion provided at the other end of the piezoelectric device in the long-side direction, a middle-pitched sound band generating portion provided between the high-pitched sound band generating portion and the low-pitched sound band generating portion, a first weight member provided at the high-pitched sound band generating portion, a second weight member provided at the low-pitched sound band generating portion, a first elastic member provided at the middle-pitched sound band generating portion, and a protection member which covers the piezoelectric device, the first weight member, the second weight member, and the first elastic member.

According to some aspects of the present disclosure, the sound generator may further include a second elastic member provided at the low-pitched sound band generating portion.

According to some aspects of the present disclosure, the low-pitched sound band generating portion may be greater than each of the high-pitched sound band generating portion and the middle-pitched sound band generating portion.

A sound apparatus according to an aspect of the present disclosure may include a sound generator including a piezoelectric device, and an external frame which covers the sound generator and includes an opening portion and a plurality of first vibration plates, and the sound generator may be disposed at the opening portion.

According to some aspects of the present disclosure, the external frame may include a first portion generating a high-pitched sound band, a second portion generating a low-pitched sound band, and a third portion generating a middle-pitched sound band between the first portion and the second portion.

According to some aspects of the present disclosure, the opening portion may be disposed at the first portion.

According to some aspects of the present disclosure, the first vibration plate may be disposed at the third portion.

According to some aspects of the present disclosure, the sound generator may be disposed at the opening portion and the third portion.

According to some aspects of the present disclosure, the external frame may include a plurality of second vibration plates and may be disposed at the second portion.

The sound apparatus according to an aspect of the present disclosure may be a sound apparatus including a sound generator generating a sound on the basis of a vibration of a piezoelectric device having a rectangular shape, and the sound generator, including a high-pitched sound band generating portion including a weight member disposed at one end of a piezoelectric device in a long-side direction, a middle-pitched sound band generating portion fixed to two vibration plates through a first elastic member at a position closer to the one end of the piezoelectric device in the long-side direction than a center of the piezoelectric device in the long-side direction, a low-pitched sound band generating portion including a weight member disposed at the other end of the piezoelectric device in the long-side direction, and a protection member covering the piezoelectric device and covering the first elastic member or provided as one body with the first elastic member, may be surrounded by an external frame and two vibration plates.

According to some aspects of the present disclosure, the low-pitched sound band generating portion may be fixed to the two vibration plates through the second elastic member.

According to some aspects of the present disclosure, an internal frame may be disposed at an area surrounded by the external frame, and the internal frame may be configured so that at least one of a sound generated by the middle-pitched sound band generating portion and a sound generated by the low-pitched sound band generating portion is introduced into a space formed in a portion of a space surrounded by the external frame and the two vibration plates and reverberated.

A sound generator according to an aspect of the present disclosure may include a piezoelectric device, a first weight member disposed at a first portion of the piezoelectric device, a second weight member disposed at a second portion of the piezoelectric device, a first elastic member disposed at a third portion between the first portion and the second portion of the piezoelectric device, and a protection member configured to cover the piezoelectric device, the first weight member, the second weight member, and the first elastic member.

According to some aspects of the present disclosure, the piezoelectric device may generate sounds of different sound bands at the first to third portions, respectively.

According to some aspects of the present disclosure, the piezoelectric device may generate a high-pitched sound band at the first portion, generates a low-pitched sound band at the second portion, and may generate a middle-pitched sound band between the high-pitched sound band and the low-pitched sound band at the third portion.

According to some aspects of the present disclosure, the sound generator may further comprise a second elastic member disposed at the second portion of the piezoelectric device.

According to some aspects of the present disclosure, the second elastic member may comprise an elastic material which differs from a material of the first elastic member.

According to some aspects of the present disclosure, the second elastic member may comprise an elastic material having a lower density than a density of the first elastic member.

According to some aspects of the present disclosure, the second portion may have a size which is greater than a size of each of the first portion and the third portion.

According to some aspects of the present disclosure, the protection member may comprise an elastic material and wholly surround the piezoelectric device, the first weight member, the second weight member, and the first elastic member.

A sound apparatus according to an aspect of the present disclosure may comprise a sound generator including a piezoelectric device, and an external frame configured to cover the sound generator and configured to include an opening portion and a plurality of first vibration plates, the sound generator may be disposed at the opening portion.

According to some aspects of the present disclosure, the external frame may comprise a first portion generating a high-pitched sound band, a second portion generating a low-pitched sound band, and a third portion generating a middle-pitched sound band between the first portion and the second portion.

According to some aspects of the present disclosure, the opening portion may be disposed at the first portion.

According to some aspects of the present disclosure, the first vibration plate may be disposed at the third portion.

According to some aspects of the present disclosure, the sound generator may be disposed at the opening portion and the third portion.

According to some aspects of the present disclosure, the external frame may comprise the plurality of second vibration plates and is disposed at the second portion.

According to another aspect of the present disclosure, the sound generator may comprises a piezoelectric device, a first weight member disposed at a first portion of the piezoelectric device, a second weight member disposed at a second portion of the piezoelectric device, a first elastic member disposed at a third portion between the first portion and the second portion of the piezoelectric device, and a protection member configured to cover the piezoelectric device, the first weight member, the second weight member, and the first elastic member.

According to some aspects of the present disclosure, the third portion of the piezoelectric device may be configured to be fixed between two vibration plates through the first elastic member, and the sound generator may be configured to be surrounded by the external frame and the two vibration plates.

According to some aspects of the present disclosure, the second portion of the piezoelectric device may be configured to be fixed between the two vibration plates through a second elastic member.

According to some aspects of the present disclosure, the sound apparatus may further comprise an internal frame disposed at an area surrounded by the external frame, the internal frame may be configured so that at least one of a sound generated by the third portion of the external frame and a sound generated by the external frame is introduced into a space formed at a portion of a space surrounded by the external frame and the two vibration plates and reverberated.

According to some aspects of the present disclosure, the sound apparatus may further comprise a port provided in the external frame to communicate with a space surrounded by the external frame and the two vibration plates.

According to some aspects of the present disclosure, the sound apparatus may further comprise another port provided in the external frame adjacent to the opening portion to communicate with a space surrounded by the external frame and the two vibration plates.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A sound generator, comprising:
   a piezoelectric device;
   a first weight member disposed at a first portion of the piezoelectric device;
   a second weight member disposed at a second portion of the piezoelectric device;
   a first elastic member disposed at a third portion located between the first portion and the second portion of the piezoelectric device; and
   a protection member covering the piezoelectric device, the first weight member, the second weight member and the first elastic member.

2. The sound generator of claim 1, wherein the piezoelectric device generates sounds of different sound bands at the first to third portions.

3. The sound generator of claim 1, wherein the piezoelectric device configured to generate a high-pitched sound band at the first portion, generate a low-pitched sound band at the second portion, and generate a middle-pitched sound band between the high-pitched sound band and the low-pitched sound band at the third portion.

4. The sound generator of claim 1, further comprising a second elastic member disposed at the second portion of the piezoelectric device.

5. The sound generator of claim 4, wherein the second elastic member includes an elastic material which differs from the first elastic member.

6. The sound generator of claim 4, wherein the second elastic member includes an elastic material having a lower density than a density of the first elastic member.

7. The sound generator of claim 1, wherein the second portion has a size which is greater than a size of each of the first portion and the third portion.

8. The sound generator of claim 1, wherein the protection member includes an elastic material, and the protection member surrounding the piezoelectric device, the first weight member, the second weight member, and the first elastic member.

9. A sound apparatus, comprising:
   a sound generator including a piezoelectric device; and
   an external frame covering the sound generator, the external frame including an opening portion and a plurality of first vibration plates,
   wherein the sound generator is disposed at the opening portion,
   wherein the external frame comprises a first portion configured to generate a high-pitched sound band, a second portion configured to generate a low-pitched sound band, and a third portion configured to generate a middle-pitched sound band between the first portion and the second portion,
wherein the sound generator further includes:
a first weight member disposed at a first portion of the piezoelectric device;
a second weight member disposed at a second portion of the piezoelectric device;
a first elastic member disposed at a third portion located between the first portion and the second portion of the piezoelectric device; and
a protection member covering the piezoelectric device, the first weight member, the second weight member and the first elastic member.

10. The sound apparatus of claim 9, wherein the opening portion is disposed at the first portion.

11. The sound apparatus of claim 9, wherein the first vibration plate is disposed at the third portion.

12. The sound apparatus of claim 9, wherein the sound generator is disposed at the opening portion and the third portion.

13. The sound apparatus of claim 9, wherein the external frame is disposed at the second portion and comprises a plurality of second vibration plates and the external frame.

14. The sound apparatus of claim 9, wherein the third portion of the piezoelectric device is configured to be fixed between two vibration plates by the first elastic member, and wherein the sound generator is configured to be surrounded by the external frame and the two vibration plates.

15. The sound apparatus of claim 14, wherein the second portion of the piezoelectric device is configured to be fixed between the two vibration plates through a second elastic member.

16. The sound apparatus of claim 14, further comprising an internal frame disposed at an area surrounded by the external frame,
wherein the internal frame is configured to generate at least one of a sound by the third portion of the external frame and a sound by the external frame is introduced into a space formed at a portion of a space surrounded by the external frame and the two vibration plates and reverberated.

17. The sound apparatus of claim 16, further comprising a port at the external frame to communicate with a space surrounded by the external frame and the two vibration plates.

18. The sound apparatus of claim 17, further comprising another port at the external frame adjacent to the opening portion to communicate with a space surrounded by the external frame and the two vibration plates.

* * * * *